(12) United States Patent
Milford et al.

(10) Patent No.: US 7,221,945 B2
(45) Date of Patent: May 22, 2007

(54) SYSTEM AND METHOD FOR ESTABLISHING AND CONTROLLING ACCESS TO NETWORK RESOURCES

(75) Inventors: Matthew A. Milford, Charlotte, NC (US); Iain Stuart Campbell Walker, London (GB)

(73) Assignee: Leapstone Systems, Inc., Somerset, NJ (US)

( * ) Notice: Subject to any disclaimer, the term of this patent is extended or adjusted under 35 U.S.C. 154(b) by 800 days.

(21) Appl. No.: 10/429,419

(22) Filed: May 5, 2003

(65) Prior Publication Data

US 2003/0224781 A1 Dec. 4, 2003

Related U.S. Application Data

(60) Provisional application No. 60/380,062, filed on May 3, 2002.

(51) Int. Cl.
H04Q 7/20 (2006.01)
H04L 12/28 (2006.01)
(52) U.S. Cl. .................. 455/452.1; 455/453; 370/235; 370/395.21
(58) Field of Classification Search .............. 455/406, 455/453, 452.1; 370/235, 395.21
See application file for complete search history.

(56) References Cited

U.S. PATENT DOCUMENTS

| 7,043,225 | B1* | 5/2006 | Patel et al. | 455/405 |
| 7,058,846 | B1* | 6/2006 | Kelkar et al. | 714/4 |
| 2002/0107026 | A1* | 8/2002 | Agrawal et al. | 455/453 |
| 2002/0181462 | A1* | 12/2002 | Surdila et al. | 370/392 |
| 2003/0104817 | A1* | 6/2003 | Damnjanovic | 455/452 |

* cited by examiner

Primary Examiner—Barry Taylor
(74) Attorney, Agent, or Firm—Duane Morris LLP

(57) ABSTRACT

A telecommunications network uses a supervisory service broker in a packet messaging environment, particularly Session Initiation Protocol (SIP) messaging, to changeably allocate and to account for the usage of network resources by users. The SIP INVITE and other messages are passed through the supervisory broker, monitored for accounting and potentially redirected to change allocations of resources. The resources can generally comprise applications and applications servers such as media storage and playback, voicemail and directory services, subnet messaging and instant messaging, voice-over-Internet, wireless linkages and others, and can be logically grouped in packages that are allocable. Users such as telecom carriers and others can contract for usage and also can contract to provide resources for use by others, in an unlimited way or according to terms, and for appropriate credit.

34 Claims, 9 Drawing Sheets

Logical Service →

Publish Operational Fields, Messages, Adapters, Logical Services and Service Control Groups Definitions to Service Manager Successive "INVITE" Signals ← Prior Art SIP Telecom Application Server (Proxy)

SIP Telecom Application Server (B2BUA)

SYSTEM AND METHOD FOR ESTABLISHING AND CONTROLLING ACCESS TO NETWORK RESOURCES

CROSS REFERENCE TO RELATED APPLICATION

This application claims the priority of U.S. provisional patent application Ser. No. 60/380,062, filed May 3, 2002.

FIELD OF THE INVENTION

The invention relates to the configuration and operation of communication networks including local and wide area communication networks used for data, voice, media and other communications. The invention provides a method and structure for standardized resource definition and communication steps, whereby resources coupled to a network can be quantified, specified and made available, widely or within limits such as to members of an enterprise. The invention also permits resources to be added and removed or the terms of their use changed over time. Furthermore, the available capacity of such resources can be allocated, and an accounting can be made for use.

The invention is widely applicable to the management of network data and media services. A less than comprehensive list includes Internet telephony, messaging, conferencing, voice-mail, directory and search services, portable digital device operation and media playback, location related services, entertainment and games, etc. These services involve servers in data communication over the network, each server (or application running on a server) having certain offerings of data or data processing capabilities. The services and the manner of using them are limited in various ways, such as data capacity, bandwidth, media type, number of concurrent users, etc. The services may have different assigned values. The services may require compliance with particular signaling formats and protocols.

According to an aspect of the invention, a collection of varying hardware and data processing resources that can be made accessible over a network for use, are managed and allocated collectively. In one embodiment, a supervisory Service Broker employing standard signaling techniques is used to define the function of available services and how the services are accessed, thus building a store of information defining the resources. The Service Broker allocates use of the resources, taking into account capabilities of the resources and requirements of the users, as well as other considerations, which are encoded in the store of information and can be used together with other data such as location, policy ownership and loading information, to modify the allocation in a time varying way.

Standardization of resource definition is made possible through the Service Broker. Therefore, resources need not be limited to resources that are made available by a limited number of operators. Instead, the Service Broker can handle offerings of available resources made widely available by any supplier or proprietor of telecommunications resources, having available capacity to let or perhaps to sub-let. Thus it is possible to accommodate priority preferences and variable pricing, facilitating competition in the supply and use of services. Subscription arrangements can be used. Subscribers with excess available telecommunication resource capacity can contract to obtain credit when the capacity is used by others.

The invention is applicable to high level network operators, communications service suppliers, operators of subnets coupled to networks, proprietors of servers, or owners of capacity to run telecommunication applications and media services on servers that may be owned by others. From the operator/supplier perspective, potentially limited capacity is allocated efficiently in a way that permits close cost accounting and utilization control. From the user's perspective, the scope of available resources is made equal to a maximum subset of available resources that the user is capable of exploiting, which resources are made available to be invoked selectively and in a predictable fashion via the Service Broker.

BACKGROUND OF THE INVENTION

Data and voice communications networks increasingly rely on general purpose packet switching networks, such as TCP/IP addressed data communications, to transfer packet information among numerous different sorts of nodes with varying capabilities. The nodes include applications on end user terminals that exchange messages, various hubs, routers and switches that direct the packets over various communications links operable at different data rates, shared servers that store and/or supply services to the users such as audio, video conferencing or program distribution, and ancillary services associated with communications activities, such as diagnostics, activation (provisioning), billing, metric collection for traffic engineering and planning, and other functions.

Such resources have limited capacity and are not free. The resources are sold or rented to users, such as subscribers or members of an enterprise, typically with charges being assessed according to the capabilities of the services that the user reserves, such as the bandwidth of respective communication paths. Various primary and auxiliary hardware and software elements are coupled to the network (or to the enterprise subnet or the like) to provide services. These elements are owned or controlled for the benefit of particular parties, e.g., the owners, their subscribers and authorized users.

The resources are generally coupled over a common communications network. Addressing, encryption and authorization techniques are available to limit the use of certain resources to authorized users or to monitor the extent of usage by particular users or groups. For example, subscribers may contract for access up to a bandwidth limit and the supplier can monitor usage to disconnect the user (disable further usage) or to change to a different billing rate if the limit is met.

To an extent, communications services, media programming, data processing applications and other services, are commodities. In fact, communications transport and data applications and services can be treated as commodities at various different levels. At each level, the commodities can become the basis of a market. In that market, competition on the supply side and on the demand side can improve availability of existing services and encourage production of additional ones, allocate available services efficiently, make better use of capacity, and reduce expense.

Combinations of services packaged together across multiple service suppliers in a shared revenue model to meet specific target market needs and for specific time based events can increase the value of commoditized services to a target subscriber base, yielding an increase in revenue opportunities and market adoption rates.

It would be advantageous, and it is an aspect of the present invention, to facilitate markets in such commodities. The invention provides what is needed in information and standardized processing techniques, to know and enable comparison of what communications and data applications commodities are, what they can do and how to use them. The information and standardized techniques can include various forms of valuation information and quantization techniques for treating the bandwidth or other capacity in a way that it can be subdivided into units of time and/or data and can be contracted (subscribed) and charged for in such units.

As an additional beneficial aspect, above and beyond considerations of allocation of resources among users and improving the availability and value of services by establishing a market, it is appropriate to supervise the provisioning of resources to users so that a user or a user's application is not permitted to invoke a resource that the application is not capable of using (or perhaps is not capable of using the resource as fully as another competing application or user). On the other hand, loading conditions and available resource allocations can be varied. If a given less expensive resource happens to be unavailable, it is an added value to switch the user to an alternative source that is available, even if that may be a trade-up for the user. Such options and alternatives, and others, advantageously are taken into account in efforts to efficiently provide, configure, allocate and use the resources.

It would be advantageous to improve network capabilities while employing an allocation system that is highly versatile, highly variable, and involves a minimum overhead.

SUMMARY OF THE INVENTION

It is an object of the invention to provide a series of apparatus and methods to efficiently organize and accommodate the delivery of variable products and services to variable types of users, wherein the products and services comprise telecommunications and data processing services delivered over a common communication network to which are coupled applications service devices for providing the products and the users or intermediate nodes that use them or enable such use.

It is another object to use aspects of simple and standardized communication protocols, such as Session Initiation Protocol (SIP) to organize the data flow needed to accommodate the delivery of the products and services. The Service Broker preferably is transparent to a developed SIP Telecommunications Application and the underlying network during brokering activities while allowing it to be efficiently integrated into a potentially existing complex communications network.

It is an important object of the invention to improve the efficiency of communication and data processing services by making more complete use of available resources than was previously possible in preset custom-designed configurations that lack the ability freely to shift the provisioning of assets to meet changing demands.

Through the one time integration of the service broker into the operational systems environment of a service provider, new and ongoing upgrades of products and services can be efficiently placed into operations via efficient and robust tools contained within the service broker.

These and other objects are met in a communications and data processing convergence system wherein a telecommunications network uses a service broker in a packet messaging environment, particularly Session Initiation Protocol (SIP) messaging, to changeably allocate and to account for the usage of network resources by users. The SIP INVITE and other messages are passed through the service broker, monitored for accounting and potentially redirected to change allocations of resources. The resources can generally comprise applications and applications servers such as media storage and playback, voicemail and directory services, subnet messaging and instant messaging, voice-over-Internet, wireless linkages and others, and can be logically grouped in packages that are allocable. Users such as telecom carriers and others can contract for usage and also can contract to provide resources for use by others, in an unlimited way or according to terms, and for appropriate credit.

BRIEF DESCRIPTION OF THE DRAWINGS

These and other features and advantages of the present invention will be more fully disclosed in, or rendered obvious by, the following detailed description of the preferred embodiments of the invention, which are to be considered together with the accompanying drawings wherein like numbers refer to like parts and further wherein.

DETAILED DESCRIPTION OF THE PREFERRED EMBODIMENTS

This description of preferred embodiments is intended to be read in connection with the accompanying drawings, together forming the description of the invention and illustrating certain non-limiting examples. The drawings show certain features in schematic or figurative form in the interest of clarity and conciseness.

Figure 1:
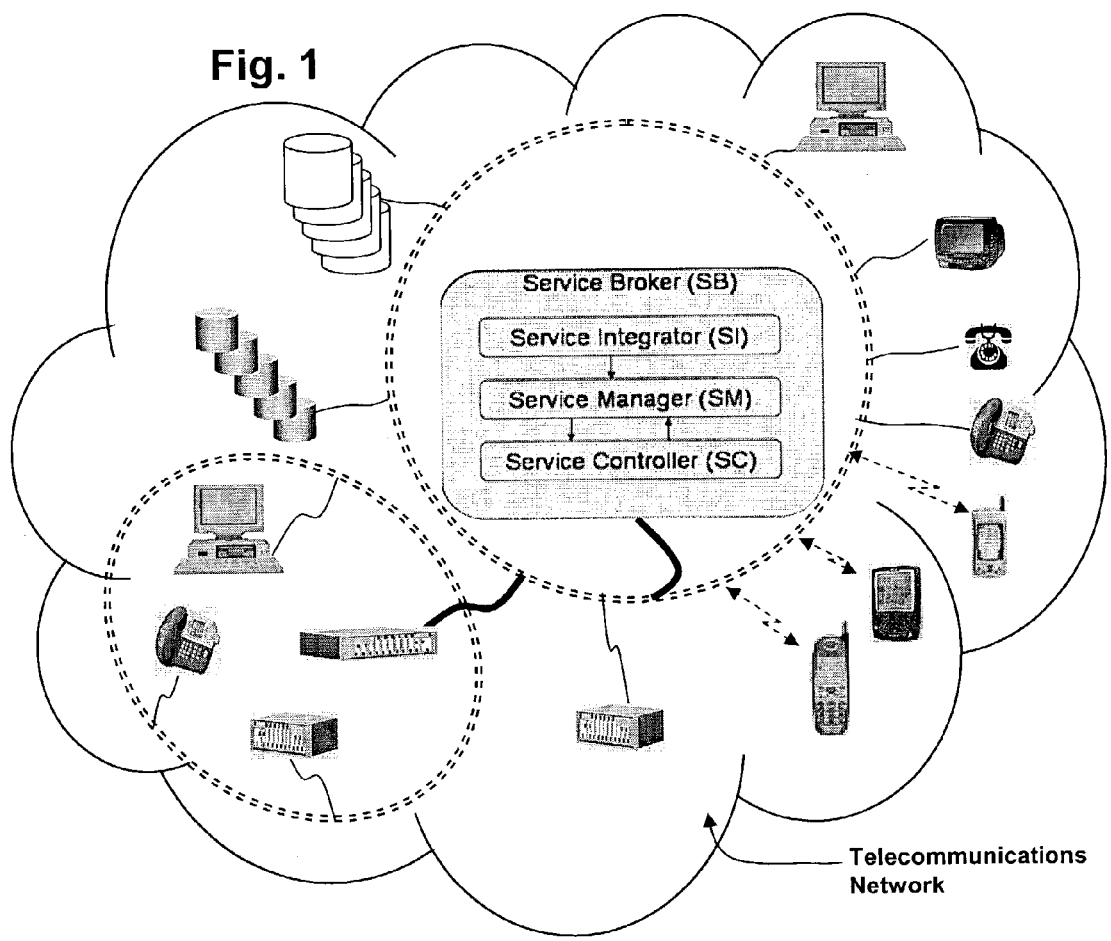
FIG. 1 is a schematic illustration of a network, including a subnet, wherein a number of telecommunications applications and media server resources are available on various devices coupled to commonly to the network, as are a variety of differently configured users, wherein a service broker according to the invention is provided for establishing and controlling access to the network resources.

Referring to FIG. 1, a network encompasses a number of different telecommunications and data processing devices, each of which has various capabilities. The capabilities are generally designed features of the devices, which are intended for particular uses. The capabilities may include data and signal processing abilities, wireless transponder abilities, data storage, annunciation and display abilities, audio and/or video encoding, communications with other networks such as wireless network and/or cell phone communications, etc. The capabilities of each individual device may be greater or less than any other device in one category or another. However, some of the capabilities of the devices, including capabilities that are not being used all the time, are useful not only to the device itself or its local group of devices on a subnet of the network. According to an inventive aspect, a service broker system is provided to facilitate the offering and exploitation of the services and capabilities of particular units or groups of units or just isolated applications and processing time of units coupled to the network, by other units and groups of units on the network.

The invention can be applied cooperatively to exploit the telecommunications applications that are available among the servers and devices of a particular enterprise, such as a business or educational or government entity. The invention can be applied by a telecommunications carrier, for example, to spread the capabilities of a number of telecommunication application and media servers, over a larger number of customers who share the use of the servers and their applications. Alternatively, the invention can be arranged to barter services of telecommunications applications and media servers over an open network such as the Internet. According to an inventive aspect, the particular allocation of resources over many users who may demand the services (generally termed the "provisioning" of the users) is changeable over time.

Also according to the invention, the service broker processor that handles the provisioning of users (and changes in the provisioning) is coupled to a data store, explained in more detail below or when effecting provisioning builds a data store by communications with other devices on the network. The data store defines the specific attributes of allocable telecommunications applications and also defines the specific attributes of provisionable users who might use the applications (which "users" should be construed whenever possible to include operational nodes as the "users," and not only terminal users such as human conversants or only their directly operated terminal devices).

For the telecommunications applications, the data store that is preliminarily developed while using the Service Broker, can define in detail the interface details and protocols used for input and output of signaling and content data paths, the data type and format, the nature, capacity and timing of throughput, etc. For terminal devices, the data store can hold similar information that defines the nature and content of input and output data, the device type and local operating system, if appropriate, model and optional component information, etc.

One object of defining the telecommunications applications is that the applications can be treated as fungible commodities with comparable attributes. The allocable services of the telecommunications applications can be bartered, contracted, sold, loaned, etc., for the benefit of use by the provisionable users.

The devices shown in FIG. 1 for the most part are separate terminal devices, some of which are directly user operated. The same sort of configuration is found in a case, for example, in which the devices might or might not be separately housed, but instead are components of a system wherein the devices are components that operate cooperatively. The component devices could be commonly coupled to a subnet as shown in part of FIG. 1. The components could be different applications that are running on a single server, sharing the processing time of a central processor. An example could be an enterprise telephone exchange system, wherein the telecommunications devices could include a voicemail system, components of the voicemail system, such as audio recording and annunciator modules, a directory service module, etc.

According to the invention, a plurality of telecommunication applications ("TA"s) of any sort that may be usefully exploited by provisionable users are available as commodities. The TAs may be generic applications that are well defined and are provisioned to other users who have a need. The TAs could be internally developed by and enterprise or perhaps obtained from a third party. According to the invention, the TAs also can be simply services obtained from a third party.

The respective TAs can be efficiently integrated into the information technology operational systems of a telecommunications service provider or other user or enterprise or the like, by using a Service Broker (SB) whereby the requirements and functions of the TAs are specified and defined within the system. Thus the TAs can be deployed efficiently and appropriately to meet needs. The TAs also can be compared, priced, offered under terms, bartered and otherwise managed and accounted for during service and at other times.

Figure 4:
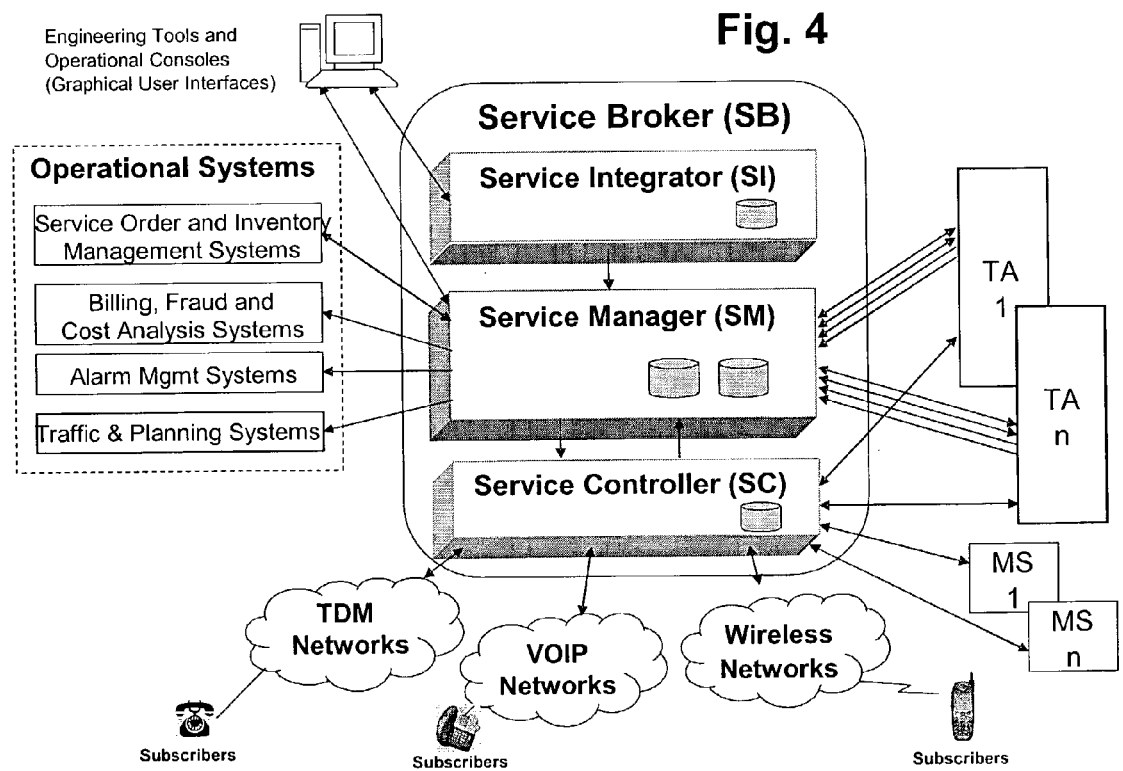
FIG. 4 is a block diagram showing additional details including application of the invention to operational systems, Telecommunication Applications, Media Servers, TDM networks, VOIP networks and wireless networks and combinations thereof.

A block diagram showing the Service Broker (SB) and its network relationships is shown in FIG. 1, and a functional depiction of the Service Broker shown in FIG. 4 also shows its engineering and operational position as well as its relationship with telecommunications applications TA-1 to -n, and media servers MS-1 to -n (generally termed "resources"). The Service Broker is shown in FIG. 4 as serving TDM, VOIP and Wireless Network subscribers. It is possible to employ the invention with respect to subscribers and resources that are on the same network or where some subscribers are on subnets or even proprietary networks, provided there is a communications path. See also FIG. 1.

The Service Broker comprises three components that each has a role in fulfilling the requirements of a brokered service environment for a Telecommunications Carrier. A brokered service environment is one in which services are well defined and are made available to meet defined needs by comparing the services and the needs. Where possible, alternative choices of services may be provided, with terms and conditions of use that likewise tend to distinguish the services. In view of the terms that are inherent in the services (such as their input/output requirements/characteristics) and those that may be applied arbitrarily by the Service Broker (such as pricing and perhaps capacity limitations), the services can be compared. By offer and acceptance or by preferences or by subscription and fulfillment and other deal making arrangements, the Service Broker matches needs from users and user devices with deployable services. Where possible, the Service Broker allocates the services of the TAs to the users and produces the appropriate authorization commands that enable the provision of services to proceed.

The functional components available for provisioning to user devices can be separated into different operational devices or parts (e.g., servers) or largely can be incorporated into a multifunctional device wherein time and processing resources are shared among these functions by time division or by demand response. The functional components in the embodiment shown are a Service Integrator (SI), a Service Manager (SM), and a Service Controller (SC) module. These modules can be distinct server environments, or can be applications routines that operate in a single server.

Figure 5:
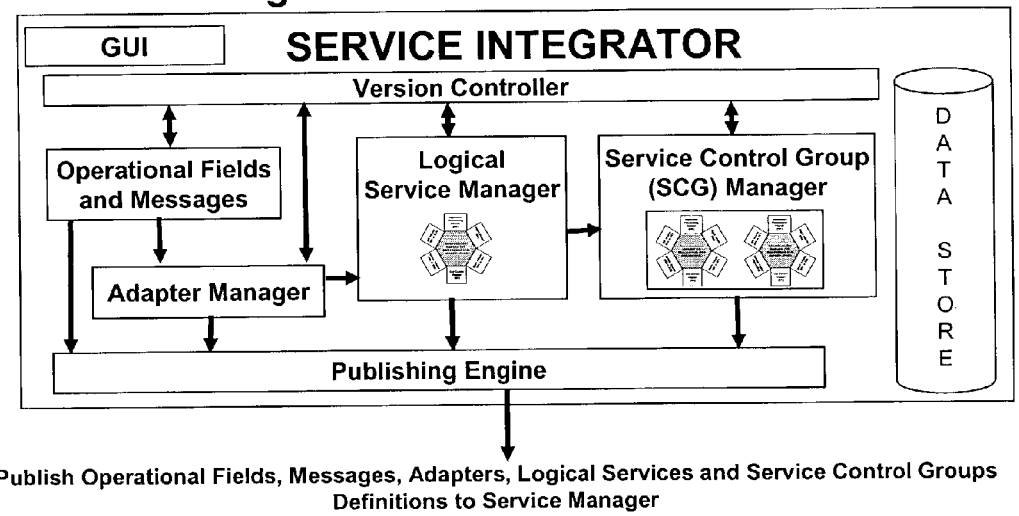
FIG. 5 is a block diagram showing the functional components of the Service Integrator component of the Service Broker

The first module of the Service Broker (SB) is a Service Integrator (SI) tool and is best shown in FIG. 5. The Service Integrator allows Network Engineers, Information Technology Engineers and Product Engineers to define the properties of a target TA. This information is stored in the data store that is provided in or made accessible to the SB. The data store can be contained in the Service Integrator as a predetermined database.

The properties that are defined to represent the TA (the Telecommunications Application) describe requirements, input and output characteristics and the like. These properties are objective criteria and bases for finding in the available inventory of allocable TAs, a product that can serve a desired function. The properties also provide an objective basis for comparison of the TAs as to various parameters. For audio related components, for example, a sampling rate and sample resolution might be specified, for comparison to a required rate and resolution. For data storage components, the criteria could allow comparisons of data capacity, access time, number of concurrent users, etc.

Having been specified in this way, the TA is represented as a Logical Service (LS). The Logical Service is a definitional view of the TA which specifies how it can be provisioned, accounted, managed and invoked by the Service Broker. In a preferred use of the invention, the Logical Service is a resource that is applicable to provide services to other users that have the ability to exchange data with the Logical Service, namely any other device on the network that can communicate with the TA in a manner that complies with the conditions by which the TA is defined as a Logical Service. The Logical Service can be exploited, for example, by a telecommunications carrier in their information technology system, in the same way that the carrier might have used an application for which the carrier provided a "captive" server that the carrier needed to buy, program, maintain, etc.

Figure 6:
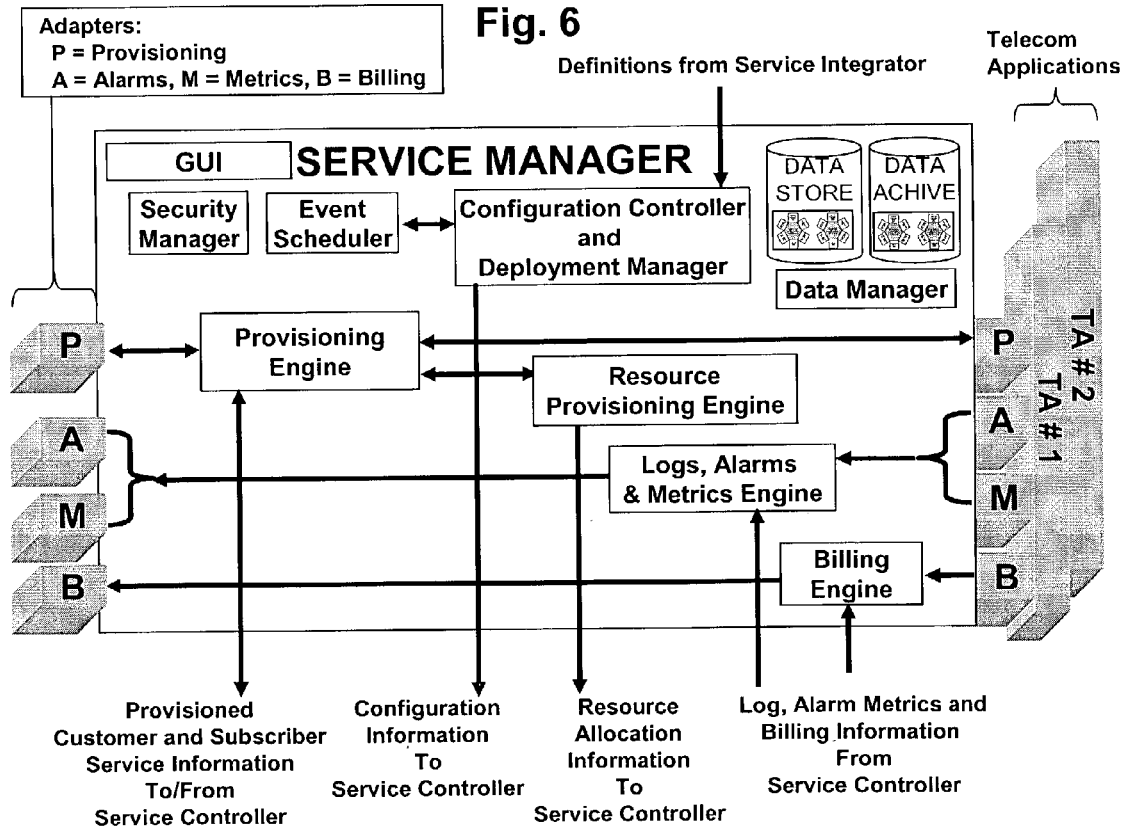
FIG. 6 is a block diagram showing the functional components of the Service Manager component of the Service Broker

The Logical Services can be grouped together as packages of Logical Services, advantageously providing basic and optional levels of related services. These Services are frequently interactive and can be grouped in a way that is designed to optimize their cooperative use. In that case, packaged Logical Services are grouped in a so-called Service Control Group (SCG). The SCG, both collectively and due to the definitions and specifications of its LS components, defines the interactions, precedence and conflict rules necessary for the Logical Services to cohesively be sold, executed and billed. Each LS and SCG is versioned and configuration managed so that upgrades, migrations and packaging changes can be managed in a production environment. After a valid SCG is defined it is published to the second module of the Service Broker SB. The second module of a Service Broker is a Service Manager (SM) and is shown in FIG. 6.

The Service Manager receives published or approved SCGs and their related Logical Services. Once an SCG is validated against all operational prerequisites, it can be deployed and activated. Once activated, an SCG can be provisioned to meet the needs of Subscribers. More particularly, the Service Manager SM receives a user signal containing a provisioning request defining the user's need. This can involve a provisioning transaction directed to the Service Manager, i.e., an Add-Subscriber-To-SCG request. In order to serve the need as so defined, the Service Manager selects an appropriate TAs based on the SCG and LS grouping thereof. More particularly, the Service Manager consults the data store, comparing the user requirements from the preliminary requests with the available allocable resources. Assuming a match, the Service Manager determines the application server(s) that contain the necessary LS, TA and/or SCG, based on the properties and rules defined in the data store of the Service Integrator SI.

The Service Manager makes an allocation and effects the signaling steps necessary to authorize the SCG, LS and/or TAs concerned, to proceed to serve the user request in real-time by the Service Controller that constitutes a third module of the Service Broker SB. This includes authorizing and addressing steps for resource allocations that potentially are time and location based. Additionally, the Service Manager preferably takes additional steps to account for the user's exploitation of the allocated resource, such as audit trail, usage monitoring and billing functions. The Service Manager authorizes the subscriber or user's request for service by notifying the allocated SCG, LS and/or TA. This generally includes providing subscriber information to the allocated resource. The subscriber information could be limited to identity information such as a network address, or can include additional information for determining the subscriber's requirements, equipment configuration and the like.

The Service Manager preferably stores the Subscriber information together with information regarding the allocation, as an entry or reference copy in a relational database maintained for management, auditing, inventory reconciliation and billing purposes. The Service Manager receives billing, metering and alarm information from the application servers or from a Service Controller. In the case of allocation and services for a telecommunications carrier, the Service Broker can also process the information to take any required further action such as to distribute the information to various IT operational systems of the carrier, for example to generate usage related billing information.

The third module of the preferred embodiment of the Service Broker is the Service Controller (SC), which resides (logically) between the application servers that contain the operating telecommunications applications TA and the network. This layer can be referred to as the Service Control Plane within which the SC deals with incoming requests for services from subscribers, and relays information to the appropriate telecommunications applications TA, as determined by which of the SCG(s), LS and/or TAs has been provisioned to serve that subscriber or request. The Service Controller SC can also initiate other steps based on the signaling interactions defined within the Service Controller SC and triggered by occurrences that may arise in the signaling between the subscriber and the SCG/LS/TA and the Service Controller in between them.

The Service Controller can retain the overall multi-service context of the allocation of resources, by remaining in the signaling path and relaying appropriate signaling messages in either direction. An alternative is preliminary signaling to authorize opening of at least certain transmissions direct between the subscriber and the resource, which is workable if other provisions are in place to regulate the exchange. In the preferred arrangement, the Service Controller SC signals through a defined signaling interface adapter. In addition, when brokering real-time requests for services, the Service Controller can generate and gather metrics (e.g., time of day of start and stop, network loading level, etc.), other billing information and alarms. The Service Controller also reports data or status, regularly or upon occurrence of a transaction or when polled, up to the Service Manager SM. This permits further summarization and transmission of pertinent data to the Telecom Carrier for use in its operational environment.

The Service Integrator (SI) tool contains or generates the information that defines the available telecommunications Applications (TAs) that will be available for deployment and use within the communications network. This portion of the Service Broker is best shown in FIG. 5. The Service Integrator (SI) allows Network Engineers, Information Technology Engineers and Product Engineers to define the properties of a given telecommunications Application TA, which information is stored to enable the Service Broker (SB) to make appropriate and efficient use of the Application within the constraints of its properties. Preferably, the Applications (TAs) are selectively used to their fullest capacity and capabilities. Many other objectives can be served in making the selection, and can be programmed, such as selectively balancing cost and benefit considerations in choosing among alternatives. These might include balancing quality with cost or speed, accounting for service life, etc. The system is versatile as to which considerations will be used in allocating telecommunications Applications to meet needs, but in order to do so, each telecommunications Application must be fully defined by a set of variables or properties that is sufficient to enable programmed selections.

In this context, the telecommunications Applications are functional building blocks and can involve basic operations such as point to point data transmission regardless of content and possible associated services such as error detection and correction, which could be included in the corresponding logical service LS or could be optional additional services. The Applications may concern addressing or directory services such domain name servers, email, number translation or forwarding, phone or fax addressing. The Applications may concern modifications to data in some form, such as data compression and decompression, format conversions, language translations, spell checking or text formatting. The Applications may concern the supply of desired services, such as reporting stock information, on-demand audio or video program delivery, etc. All these Applications have defined characteristics that are encoded to a sufficient level to enable a selection.

The Applications that are defined in this way are generally not limited to the smallest possible building blocks. For example, although spell checking may be a defined building block, there may be another building block, such as Email sending, for example, that can be arranged automatically to invoke the spell checking block as an included part of a Logical Service LS or Service Control Group SCG. Preferably, not only are the Applications defined on the smallest possible building block units, but where possible also are defined by collections of building blocks. The collections can be blocks that definitely are to be invoked as a unit, or blocks that might be invoked e.g., depending on the progress of user selections or other factors. Inasmuch as selections can be made automatically in real time, any potentially invoked blocks can be selectively assigned when and if they are needed. The Applications and groups of Applications that are available, and are defined in this way, are represented in a database that is maintained by or available to the Service Integrator (SI) subsection of the Service Broker SB). Each possible Application or any defined collection of serially employed or otherwise related Applications preferably is defined as a Logical Service (LS), or as one or more Service Control Groups (SCGs) when defined LS are grouped.

Figure 2:
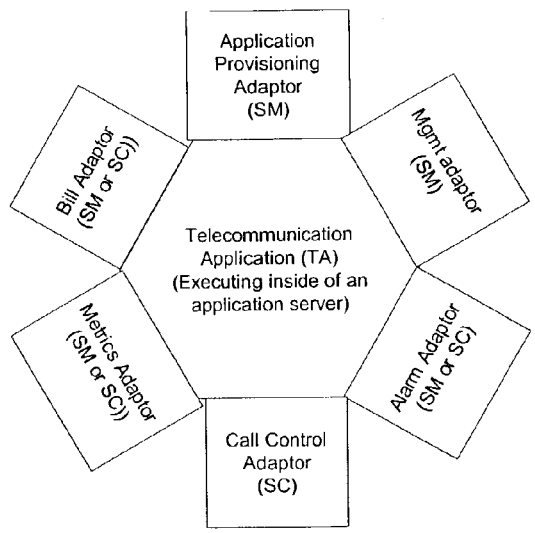
FIG. 2 is a block diagram showing a logical service and exemplary parts thereof.

FIG. 2 illustrates a set of attributes that can be used to define pertinent aspects of a Logical Service (LS) for several purposes that are useful in connection with deployment, management, billing and the like. Each Logical Service has an associated logical part or "adaptor" to deal with provisioning, management, alarms, call control, metrics and billing. All the Logical Services preferably have the associated adaptors, at least in a simple form, which provides a standardized way to define and communicate with each Logical Service. The information includes, without limitation, what the Logical Services are, what Applications they use, what sort of input is expected and output produced, how to supply an input and obtain an output, whether there are relationships with other Logical Services that affect their suitability to be used in conjunction or at the same time, some measure of relative value of the service, etc.

Inasmuch as all the properties of the telecommunications Application or series of Applications of a Logical Service (LS) are thus defined, the Logical Service (LS) becomes a deployable, provisionable, billable, manageable and executable block or object that can be invoked and used to plan and deliver services. These blocks and/or their associated information can be made available to one or more parties for exploitation, such as telecommunications carriers, network operators, subnet operators and the like. These parties are often in data communication over the public networks (or at least a wide ranging network) and also can commit some of their own processing power to be used according to defined terms by others coupled to the networks.

Figure 3:
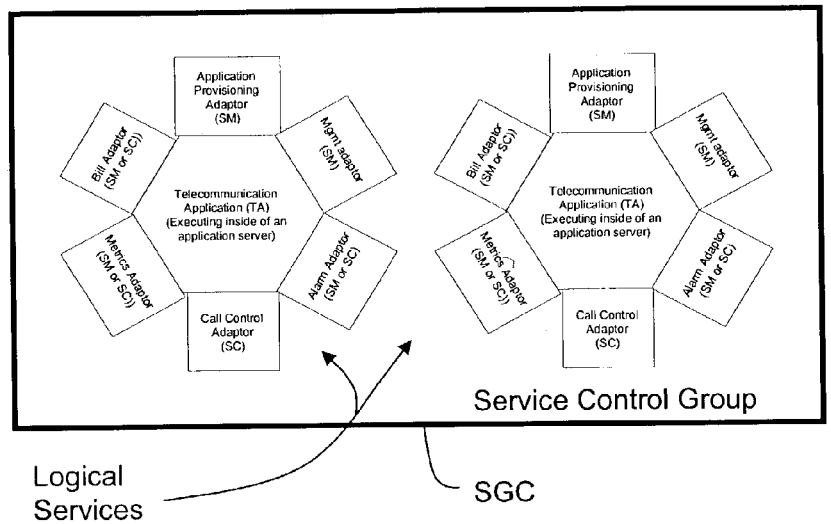
FIG. 3 is a block diagram showing a collection of logical services to define a service control group (SCG).

In this way, telecommunications Applications and information about them are made available. Applications can be defined (and once they are defined, valued, exploited, applied, marketed, etc.) as Logical Services. Grouped Applications that may operate on data, for example by serially successive operations, likewise can be defined as Logical Services. Groups of Logical Services can be offered in sets to parties such as communications carriers, operational IT systems and networks. Logical Services as grouped together as a set or package are shown in FIG. 3 as a Service Control Group (SCG). As explained for the smaller blocks, the definition of the collected Logical Services and Service Control Groups defines the interactions, precedence and conflict rules necessary for the Logical Services to cohesively be sold, executed and billed.

The definitions of the Logical Services (LS) and Service Control Groups (SCG) are subject to revisions and upgrades as dictated by experience and the availability of new ideas and equipment. For this reason, the LS and SCG data is versioned and configurations and changes are managed so that upgrades, migrations and packaging changes can be handled in a day to day operational environment. The LS and SCG versions also can be subjected to phase-ins, beta testing and other quality assurance techniques. After a valid LS or SCG is defined it is published and applied in the second module of the Service Broker (SB).

The second module of the Service Broker (SB) is a Service Manager (SM) which receives published SCGs and their related Logical Services. Once an SCG is validated against a set of operational prerequisites, it can then be deployed and activated. Once activated an SCG can be provisioned against Subscribers in which the SM will select the appropriate application server(s), containing the TA, based on the properties and rules defined in the SI. It then adds the Subscriber information into application server(s) and stores a reference copy in its own relational database. Referring to FIG. 4, and in more detail in FIG. 6, the Service Manager also receives billing, metric and alarm information from the application servers or from the third module of the SB processes the information, takes appropriate action and distributes the information necessary to the various IT operational systems of the Telecom Carrier. Preferably the system also is configured to provide a secondary or backup copy to a Disaster Recovery site.

Figure 7:
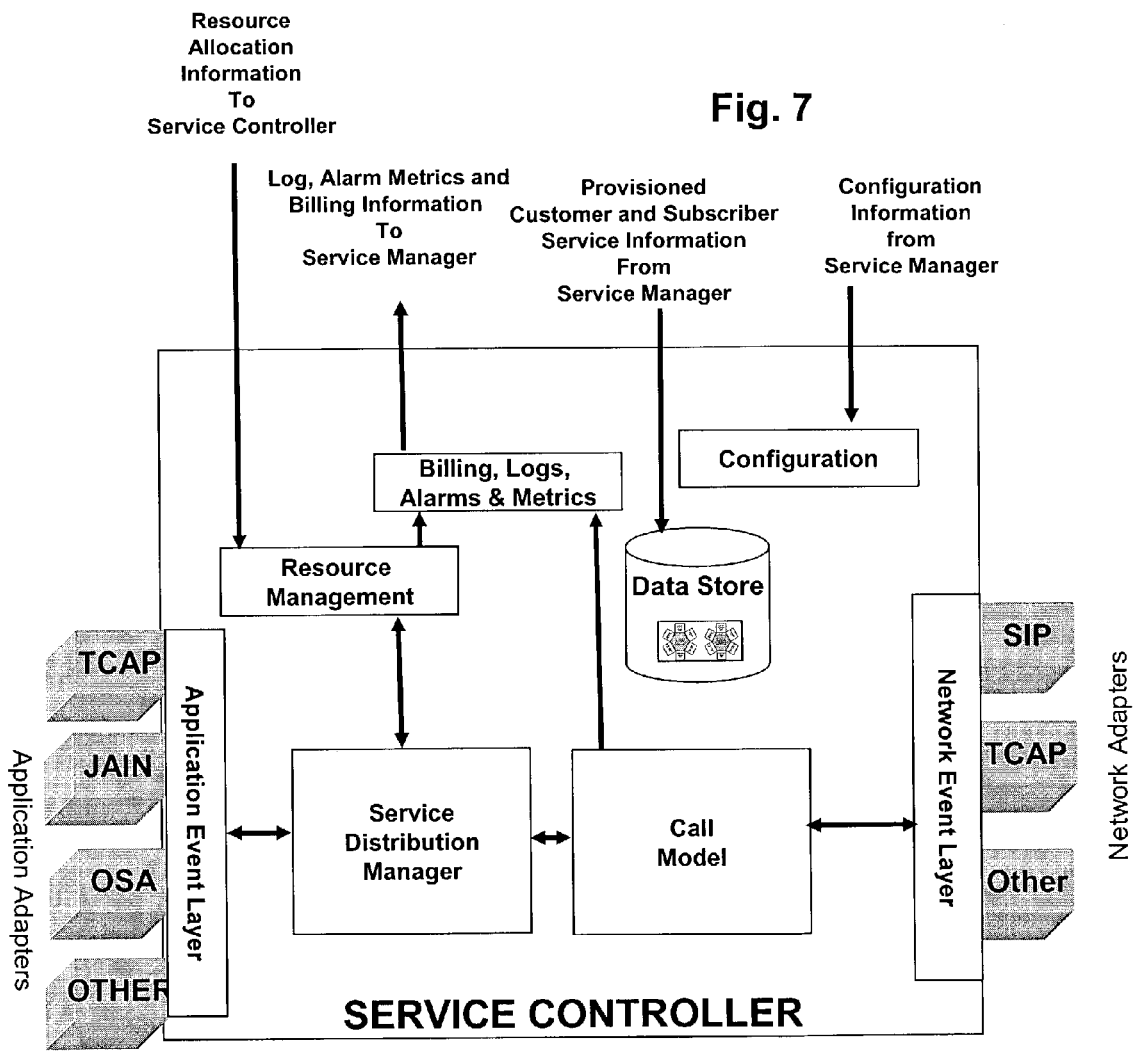
FIG. 7 is a block diagram showing the functional components of the Service Controller component of the Service Broker.

The third module of a Service Broker is the Service Controller (SC) which resides between the application servers containing the real-time version of the TA and the network. The SC is best shown in FIG. 7. The SC brokers an incoming request for services from a Subscriber to the appropriate TA based on their provisioned SCG(s) and the signaling interactions defined within it. The Service Controller retains an overall multi-service context in and transmits the appropriate signaling messages through the defined signaling interface adapter and required call view. In addition, the Service Controller, when brokering real-time requests for services, generates and gathers metrics, billing information and alarms. It then transmits them upstream to the SM for further summarization and transmission to the Telecom Carriers operational environment.

The foregoing invention has a number of advantages. When a telecommunications Telecom Carrier seeks to introduce a new service into their operational and network environments, for example, many complex and repetitive activities are normally required before the Service can become a proven offering that is "in production" or normal productive use in the carrier's operation. Conventionally, all the interactions that are to be permitted must be defined and implemented in a manner whereby the Service is compatible with and applicable to various types of platforms such as user's fixed or portable terminal equipment. The platforms may or may not be controlled by the Telecom Carrier itself or even well documented.

An exemplary scenario might occur in which a Telecom Carrier seeks to bring a new unified communications service to market, perhaps to be competitive or simply to improve the value of its offerings. The steps required to make the new service operational would include distinct projects including revisions and updates to integrate the new service into provisioning systems, billing and accounting, network operations center systems for Alarms, traffic engineering and planning systems, network architecture polling, engineering for connectivity to the network, etc. All such projects are expensive in cost and time. Conventionally, an independent revision or iteration is needed every time the Carrier seeks to integrate a new service into its offerings, and often when altering an existing one.

In addition, if in this example the new application required interaction with applications that already exist, like call screening and personal call routing services, for example, additional unique and specific development efforts on the part of the carrier and potentially the vendors of these other Telecommunications Applications also would need to take place.

Any new offering must mesh operationally with the existing applications and with the applications with which the new offering must mesh. However, w the Service Broker of the invention, the carrier has a single structured environment that can be used to add new TAs into their operational environment and network as well as to try and to prove the interoperability of the TAs together. Also by virtue of the Service Broker, the introduction and integration cost and time required are significantly reduced.

A Service Broker SB guides engineers through the steps to define the application operational informational flow paths, requirements and application interactions rules. The SB uses these definitions in real-time to appropriately communicate with the TA.

Through the one-time integration of the Service Broker into a Telecom Carriers IT operational systems, and into their network, new TAs are defined in a standardized way that minimizes much of the complication arising due to complexities of IT systems and network architectures that vary widely and may contain any number of unexpected pitfalls. Instead, any new TA would only need to connect to the extensible interfaces provided by the Service Broker.

Conventional telecommunication applications are typically designed and packaged as one monolithic component of a dedicated telecommunications system. The conventional component has dedicated application logic and a dedicated media stream processing path. When the dedicated component is not used or not used in its particular environment to its full capacity and capability, available services are going unused. As already discussed, the communications convergence engine of the invention provides the capability of establishing and controlling access to network resources in a way that treats the resources as fungible commodities that can be compared competitively and deployed when their services are the most favorable option.

The invention preferable separates and manages application components and media stream components, which are separate resource entities in the network. This improves the extent to which expensive media resources can be shared between multiple application components. The shared components are generally used to a fuller capacity than would be possible if each application required dedicated components of a capacity sufficient to meet a highest level of design loading. Inasmuch as all the participating users who share the resources are not likely to generate their peak demand at the same time (particularly if the sharing encompasses users in different time zones), the overall need for components is efficiently controlled.

The invention allows further partitioning of media and application server capacity into logical pools. Multiple components can be combined or pooled into a single large pool to provide larger capacity. A single physical component can be logically partitioned, for example on a bandwidth, time share or byte capacity basis, to subdivide a large component into smaller "pools" that represent fractions of the larger component and nevertheless can be allocated as units.

According to the invention, an operator who owns or controls resources that are coupled in data communication with a network, such as a network operator or perhaps a party who has already contracted for the use of certain resources, can sell all or part of those resources to other customers. If the operator has contracted for the services, he might cede them back to his supplier for credit. Otherwise the operator can sublet the capacity from the pool to customers of his own, who in turn could sell the purchased resources to further subtending customers.

In an arrangement where a group of participating network operators (defined as any party with control of data processing or telecommunications capacity) participate to form a common pool, each operator can draw resources from the set of resources and can benefit from unused capacity by contracting for its use by other operators. The allocation rules for each individual operator can be governed by resource policies that might be negotiated as with the competitive production and supply of any commodity. In a preferred embodiment, the invention is managed through back office systems and/or contractual terms offered and accepted by users through online graphic user interfaces. In this way, network operators become both suppliers and users and policies can develop throughout the operator hierarchy in a market style based on supply and demand.

Provisioning and deploying resources as described provides a ready capability to generate billing records based on various factors that represent value to the user and cost to the supplier, i.e., factors that are closely related to supply and demand. For telephony applications, for example, besides basing billing in a traditional way on the duration of call, the endpoints and/or the time of day, the provisioning of resources that are accessed during the all makes it possible to generate even more service-specific billing criteria and information. This information includes the number of distinct services invoked, the duration of individual services within the duration of the overall call, pay per use indicators that are related to the individual service, the policy or referral source used to invoke the service, the resource pool used to access the network element, the application server or media server used for a particular service invocation, loading conditions at any or all of these levels, etc.

The pool of resources that are shared between multiple network operators can be over-provisioned by allowing larger number of subscribers to access a smaller number of resources than would be needed without sharing. Network operators can take advantage of statistical properties of the traffic in the network when over-provisioning, e.g., taking peak traffic time in two different time zones. In order to protect one operator with larger subscriber base starving the smaller operators, the Service Broker can establish and enforce a limit on shared access by a particular operator during call time. Other arrangements, such as reservation of minimum bandwidth or other resources, can be negotiated, bought, sold and bartered.

An aspect of the invention is that the service units are fungible commodities. Nevertheless, these commodities can be subjected to contractual guarantees as well as limitations. For example, a network customer could purchase a guaranteed set of resources from an operator having capacity. The Service Broker can manage such guarantees, and ensure that there is sufficient capacity in the network to support all guaranteed requests without conflict.

Any sharing limit or contractual obligations would run together with resources that are conveyed. That is, any limitations applied to resources when originally obtained would be enforced for the operator that obtained the resources originally and also as to all subtending operators who may have purchased or otherwise arranged with the operator in question, to make use of such resource. For example, assuming that operator C1 purchases 1000 units of capacity from a service provider who offers resources, and operator C1 re-sells 1000 capacity to customer C2, then customer C2 is a sub-operator of C1 and is subject to any limitations that were applicable to C1. The Service Broker can manage the above allocation by identifying units of service capacity that are subject to conveyance, in this case permitting a maximum of 1000 units of invocation for customer C1 or customer C2 or by summing usage of C1 and C2 on a first-come, first-served basis.

There is always a possibility that the network could suffer a failure, for example due to a catastrophic occurrence. The Service Broker can be configured with an overflow set of resources to be automatically accessed in real-time when provisioned capacity is not accessible from a regular guaranteed pool. Providing this backup can be another term of supply of the services.

If a network operator purchases a block of guaranteed resources from a wholesaler without limitations, the operator who purchased the guaranteed resources can apply value distinctions such as guarantees to part (or all) of the block of resources, provided that the operator can only sell a total set of access rights that is equal to the rights purchased. Nevertheless, the access or throughput rights that can be marketed in this way permit network operators to provide and customers to contract for a level of service that is better than "best effort" service, which represents added value.

A given network operator may be below the top level in the supplier hierarchy, as a purchaser of one or more blocks of services from others, which blocks are potentially subject to limitations. That operator also introduce their own resources to the pool, in which case the operator has the option to discriminate between blocks with limitations and blocks without limitations, to add capacity and to offer additional options to its own customers.

The ability to support provisioning with limitations that run with the services is one of a number of management features to facilitate operation and to provide secure management of customer resources. The network engineering staff is involved in the specification of the input/output requirements of the telecommunications applications TA. The extent to which these are combined into logical services LS and service control groups SCG can involve a certain amount of variation and choice, which is another beneficial area of competition. Network operators and service providers can confer as to how exactly to configure and offer resources within the physical network.

The specifications included in the definition are sets of information including the network address and the capabilities that the resource can support. After the definition step, a resource can be reserved by the system for exclusive use of the network operator and its customers, or otherwise put on the market for provisioning to others, or there can be a combination of reserved and unreserved capacity. Secure user interfaces can be used to automate the process or setting up and allotting resources to different categories, for example with scripts and prompts that present choices to the network operators in defining how the resources will be used to support its subscribers and customers, and potentially also made available otherwise.

One telecommunications application TA that is widely applicable is to provide the ability to measure usage and to generate billing information. Assuming, for example, that a network operator provides or contracts for a certain degree of guaranteed capacity, the operator may wish to arrange for usage in excess of that capacity, and incur charges according to a pay-per-use model rather than an availability model. The billing information TA preferably supports the network operator by providing information as to the average usage, peak usage and timing, etc., which enables the operator to understand and optimize its needs for guaranteed capacity versus peak handling, and to make the appropriate contracts to meet those needs.

There are tradeoffs in making such choices. Certain operators may be more willing than others to incur costs for handling peak traffic, as opposed to controlling costs but experiencing service delays or the like during traffic peaks.

The operators that obtain capacity in reserve to handle traffic peaks or the like, can make this fact known to their customers and set their charge schedules accordingly.

Pay per use metering and enabling or disabling use are processing steps of the Service Broker. In the case of an operator that has provisioned for a normal average load and arranged for additional resources to be used in pay per use situations (e.g., peaks), an indicator is included in the resource management record to identify the number of resources (e.g., call-minutes or bandwidth-minutes or some other measure) to be used before switching to a pay-per-use state. This switch can be a matter of instantaneous real time usage or an integrated total of usage over time, etc. In the case of switching based on real time usage, usage can be compared to a threshold and each new call initiated when usage exceeds the threshold can be billed at pay-per-use rates, or all calls in progress as of exceeding the threshold can be billed in that way.

The Service Broker can employ a standardized operations and business support system (OSS/BSS) for handling the configuration and operation of its resource management components. Using a standardized and well documented OSS/BSS permits activation and deactivation of resource allocations in an automatic fashion. Information can be generated and manipulated in standard ways, making the system and its operation accessible to users at various levels of the wholesale/retail hierarchy. An interface for interaction with such users can preferably support OSS applications that are already available for general purpose network resource management.

According to the invention, a member network element in a logical resource pool can be replaced transparently, without interrupting the offering of services, because the Service Broker does not require a static allocation of resources to needs. Resource pools, namely groupings of network elements that are used to meet resource needs of customers, can be managed by users through the Service Broker. A resource pool can contain one or more network elements, and depending on loading and other factors, the elements may be in use at any given time.

In order to permit the configuration of pools to be altered automatically by the user through the Service Broker, procedures are provided to determine whether a change can be made without adversely affecting an active run-time component of the system. Specifically, before deactivating a resource or part thereof, the Service Broker determines whether that resource or part is in use or perhaps guaranteed, or is a required member of a resource pool that is in use or guaranteed. This does not affect the ability to add network elements to a pool, which can be done freely by accessing a pool and simply adding the new network resource that is coupled to the network and is to be activated. The Service Broker adjusts and revises resource utilization policies to include the new resource, without risking any run-time impact on processes that are then operating.

A network element can be deleted upon request from a pool, via the user interface, unless deletion causes a violation of a resource policy or interferes with an operation in progress. The user simply accesses the pool and identifies the resource to be removed. If the removal causes a violation a notification can be given. To remove a resource that is in use by one or more policies, the user can add another resource element to the pool to meet the resource needs and then remove the desired network element.

One mode of response to deletion of a network is to invoke the same action that would be taken to substitute a different network element in runtime if a failure of an element occurred. Failure is determined by lack of an expected response from an element within a specified time interval. If a network element fails to respond to a service invocation request and an alternative resource is available that can support same capability, the failed resource is considered deleted and the alternate is used until the problem is corrected and the failed resource added. This process of deleting unresponsive elements and reverting to elements found to be active can be an automatic process driven by timing thresholds or service queue backlogs (to determine unresponsiveness or failure) and polling to invite response from elements that are not presently found to be active, whereupon the elements are added if they respond to a poll.

The selection of member network elements to be used can be prioritized so as to select, other criteria being equal, a higher quality element before a lower quality one, a lower cost, shorter signal path, etc. Moreover, the prioritization can be based on network operator preferences and subscriber profile information. Since the network elements that are necessary to meet customer needs may be located in different geographic areas, an ability exists to manage the preferred order that they are accessed to meet the resource needs of the customer. Using a user interface, the network operator can define a priority or preference order of selection of network elements based upon the identification of the elements or their attributes, such as the geographic area in which they are located (provided that location data is provided in the definition of the elements).

Preference categories or preference lists can be stated in a different order for different sets of subscribers and different geographical areas. Each customer is assigned an order for resource selection when it is allocated resources. Therefore, at run-time, the subscriber automatically is allocated resources to satisfy his resource needs based upon the preference list of its parent customer.

For resource management and billing, the system preferably includes a capability of the Service Broker to manage and perhaps to distribute the load on application and media servers, provided that there are alternative choices available. To manage loading of network elements, the network operator can define a total capacity of a server and an optimized relative loading level. The maximum and optimum levels can be defined for each capability supported by the server and/or servers that support plural capabilities also can be assigned a total utilization level taking into account the relative load from each supported service.

For each capability, the operator specifies a set of parameters that model the load imposed on the network element. For example, service invocations or requests can be monitored over time, consumption factors relating to memory, processing time, buffer or queue population, response time, number of permitted concurrent users under licensing limits, etc., are all possible measures of loading. The system preferentially or absolutely limits allocation of services to meet such programmed limits, each time a resource is deployed. This allows multiple capabilities to be supported by the same server at the same time without violating its inventory limits.

The Service Broker does not contain telecommunication applications of the sort that are available for provisioning to meet network needs. Instead, the Service Broker manages requests from users of the network (e.g., subscribers connected to a Telecom Carrier network that is a subnet of the overall system network). Furthermore, the Service Broker manages the addition, deletion and allocation of resources to serve the requests.

FIG. 4 illustrates the respective interconnections of parties and systems according to the Service Broker implementation of the invention. The Service Broker elements including the Service Integrator, for specifying, vetting and initiating services, the Service Controller, for making the Telecommunications Applications available to the subscriber terminals (or perhaps to higher level nodes in the data hierarchy), and the Service Manager for tending to operations for such matters as billing and alarms, provide an organized and efficient approach to supplying of new services as well as revisions to old ones.

The invention can be applied to a number of different networks and signaling arrangements. However the invention is very advantageously is applied to IP packet networks and preferably uses a simple and standardized form of signaling in connection with deploying system resources. According to one embodiment, Session Initiation Protocol ("SIP", the base protocol being defined in RFC 3261) signaling is employed as a standardized signaling interface with Telecommunications Applications (TA) servers. Moreover, the invention preferably is embodied whereby a Session Initiation Protocol server or SIP server is provided as a buffer that passes SIP messages from one TA to another, or between TA servers, etc. In this way, the SIP server can control and redirect messages, such as INVITE, ACK and BYE messages in SIP, to serve the ends of the system as described above.

In connection with this embodiment of the invention, the Service Controller is coupled to the common network with users and telecommunications servers running telecommunications applications. These elements can communicate using SIP messaging.

In this embodiment, therefore, the Service Controller in a SIP communication network is the network component that enables the real time co-ordination of service offerings to subscribers, where the service offerings may be distributed among or may be selected from among multiple telecom application (TA) servers that are addressable using standard SIP messages. The Service Controller handles the feature interaction (principally precedence and conflict resolution) between the multiple SIP Applications servers comprising the service offering.

Figure 8:
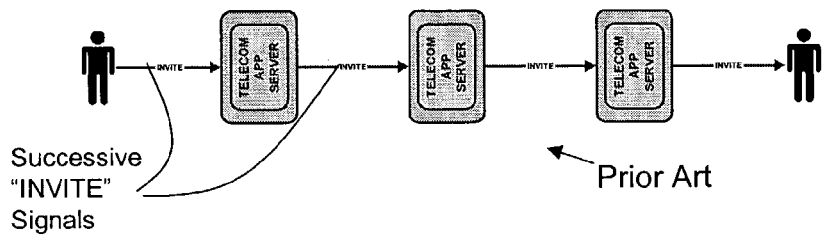
FIG. 8 is a block diagram, labeled "prior art" showing the successive signaling used in Session Initiation Protocol signaling.

Conventionally, if multiple SIP application servers (based on RFC 3261/RFC 2543) are to be involved in a single session, then a call set-up message ("INVITE," etc) must pass through all of them (with the exception of applications implemented as redirect servers, which perhaps are held in reserve). That is, if multiple application servers need to be invoked sequentially, then each application server needs to understand which application server is the next in the 'chain' creating undesirable dependencies between otherwise distinct application servers. This arrangement is shown in FIG. 8, labeled "prior art."

Figure 9:
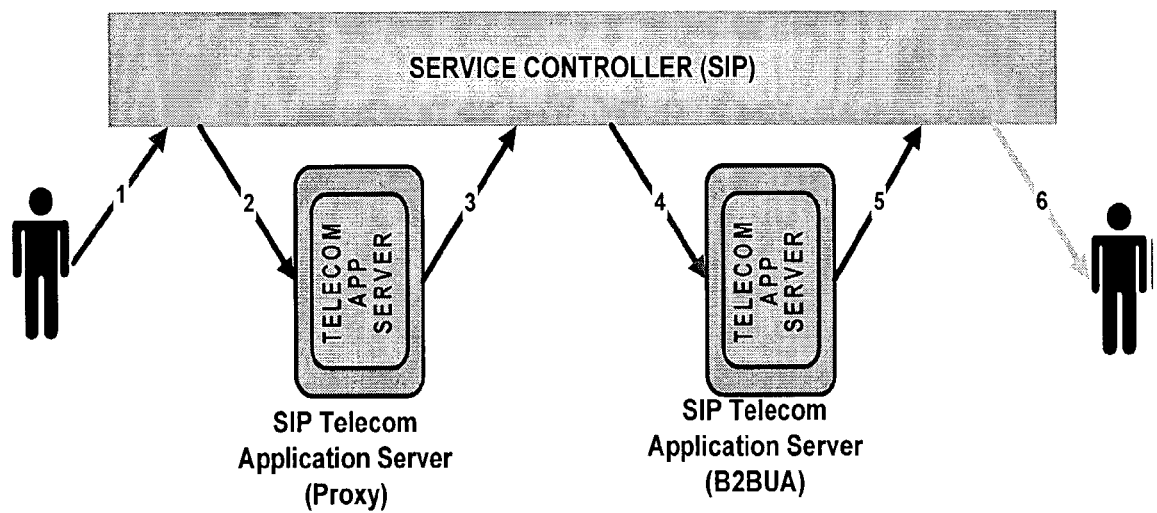
FIG. 9 is a diagram showing a preferred arrangement in which the Service Controller is arranged at each position between the successive applications.

The role of the Service Controller is to co-ordinate the invocation of Application Servers (including priority and other aspects). The Service Controller resolves any conflicts between the addressed applications. In order to enable this then the Service Controller needs to be involved as the SIP transaction is passed to it. This arrangement is shown in FIG. 9.

The Service Controller engages telecommunications application TA servers on a subscribers behalf, based on the package of services to which a subscriber has been provisioned. The package of services, such as a Service Control Group as discussed above, is controlled by the Service Controller for real-time access. The Service Control Group also contains the several rules including:

Triggering conditions for a given application (network events or connection state conditions);

Additional constraint conditions which have to be met before an application is invoked even when triggering conditions otherwise are met;

Service priority order data, whereby if multiple available services can respond to a given triggering condition, the Service Controller invokes them selectively in a predetermined order; and, Definitions of any conflict situations, including (where possible) alternative processes to invoke in the event of conflicts between applications. For example, if an application X is already 'active' on a session then application Y might not be permitted to be invoked.

In order to be able to implement the rules contained within a Service Control Group, namely a set of cooperatively operable telecom applications TA, the Service Controller correlates the messages that move among the TAs, to the user's service request. A sequence of messages in SIP commences with an INVITE message. According to an inventive aspect, the INVITE messages that are generated among the elements that are members of the Service Control Group (namely through telecom applications TA servers) pass repeatedly through the Service Controller as shown in FIG. 9. In this manner, the Service Controller at least correlates the SIP INVITE messages that emerge from the Application Servers TA, with the INVITE messages that were sent to them (3 and 5 to 2 and 4 respectively in FIG. 9), because the incoming and outgoing messages are passed through the Service Controller in the process.

The INVITE messages that are generated during operation of the application servers are used in the usual way. However by passing the INVITE messages through the Service Controller, the Service Controller has the ability to monitor the use of resources, to adjust which TAs are used, and otherwise to manage the operation.

An SIP Application Server external to the Service Controller acts as a SIP Proxy Server in FIG. 9. The Call ID of the SIP signal originating with a user (construed to include a device) can be passed to and through the Service Controller and an SIP Application Server operating as proxy that carries forward or propagates an SIP Call ID in a subsequent signal that is routed back to the Service Controller. This is one way to correlate the SIP Call IDs with the services rendered and to enable management and control. The Service Controller receives, resends and correlates the INVITEs received back from the proxy SIP Application Server with a previous INVITE that was sent by the Service Controller to that SIP Application Server. For SIP Application Servers that act as Back to Back User Agents, the SIP Call ID is not propagated, in which case other mechanisms for correlation are required in order to keep track. One technique is to use data in a private SIP Header sent in the INVITE from the Service Controller and forwarded back to the Service Controller from the SIP Application Server to make the correlation without relying on the reappearance of the known SIP Call ID as in the case of a proxy arrangement.

Figure 10:
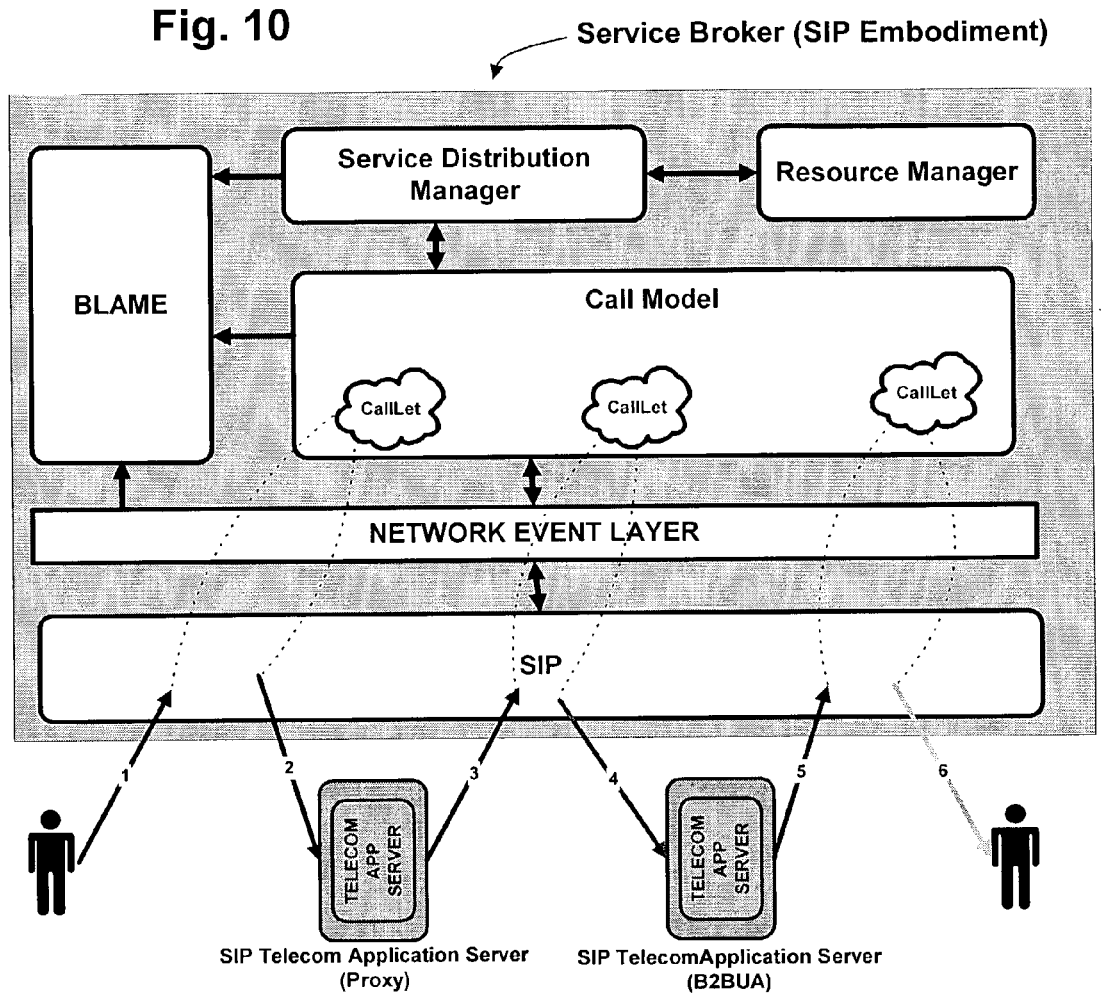
FIG. 10 is a diagram corresponding to FIG. 9 in which the Service Controller is organized to handle data as successive call-lets, described below for carrying certain information back to the Controller from the applications servers.

In this manner, a high level service call, shown schematically in FIG. 10 as originating with a user, is composed of several correlated calls. A call or message signal from one TA component to the next is not direct but instead comprises one leg from the initial component to the Service Controller and a second leg from the Service Controller to the second or destination TA. These legs of the larger call are termed CallLets. There is a CallLet active for each invoked Application Server plus an additional CallLet for the last outgoing call leg. The CallLets are correlated by a Service Distribution Manager function, namely by the Service Controller.

In order to permit the resolution of some application to application conflicts, the Service Controller can queue or stack network events and attend to them after a conflict has been resolved. This is mainly relevant for SIP Application Events associated with session tear down (BYE) which result in applications being removed from the SIP Transaction.

According to an advantageous technique, a "private" SIP header inserted by the SIP Service Broker into INVITE messages sent to SIP Application Servers and returned in the forward INVITE from the SIP Application Server to the SIP Service Broker in order to enable the two INVITE messages to be correlated. This private header is an identifier such as a serial number that uniquely identifies a transaction.

In the illustrated embodiments, one of the main roles of the Service Controller is to co-ordinate the invocation and interaction of services. In order to accomplish this, the Service Controller needs to be notified and in the preferred embodiment is directly involved in selecting and signaling to successive applications that are invoked in a chain of successive applications. The Service Controller can make service allocation decisions (based on the subscriber's service profile and other factors) as to which application server and/or telecommunications application is to be added into the chain of activities. According to an inventive aspect, this is handled by placing the Service Controller itself repetitively in the chain of successive applications, between each point at which a branch or substitution of applications servers can be effected.

FIGS. 9 and 10 show successive applications servers, i.e., two applications servers that handle successive activities commenced with an INVITE from a user (message #1) and progressing through two applications to become an output (#6). According to the example, the Service Controller is the intermediate at each leg of the succession. In this example, one applications server acts as a proxy and one acts as a B2BUA. The Service Controller receives the user INVITE (#1) and produces the actual INVITE sent to the initial applications server. That initial applications server produces an INVITE that goes back to the Service Controller instead of directly to the second applications server.

The INVITE messages are simply messages over the common packet data network. In order to keep track of the fact that the messages (#3 and #5) are parts of the same succession of services, the Service Controller needs to associate the INVITE (#3) that emanates from the initial applications server as relating to the INVITE it sent as #2. Likewise, the INVITE (#5) returned from the second application server needs to be associated with INVITE that was sent to it (#4) and, in turn, the earlier messages (#1 to #3).

In the case of the proxy applications server, correlating message #3 and message #2 is not a problem because both messages have the same call ID. Correlation of message #5 to message #4 is not so simple, because an SIP HEADER could have been changed by operation of the application server. It is still necessary to relate all these messages #1 to #6 to the same transaction.

According to an inventive aspect, correlation of the transaction is carried along through operation of the B2BUA application servers by introducing a private SIP header, LSI-BOOMERANG. This header and its contents are sent from the Service Controller to the application server. This header must be returned in any forward INVITE that the application server sends to the Service Broker, even if other aspects might have been changed by operation of the application server.

In an exemplary arrangement, the contents of the LSI-BOOMERANG comprise 17 bytes of hexadecimal data encoded as ASCII (ISO 10646 UTF-8). The first eight bytes contain the ASCII representation of the hexadecimal value of the IP Address of the node within the Service Controller cluster that is handling the session. The next byte contains the ASCII representation of the hexadecimal value of the node identifier (this is required since in the event of failure then the IP address may be assumed by another node within the cluster). The remaining eight bytes is the ASCII representation of the hexadecimal value of the unique (within the node) session identifier allocated by the Service Controller.

For example, assuming that node 3 of a Service Controller cluster has an IP Address of 192.180.32.2 and allocates a unique session identifier of 1001 then the contents of LSI-BOOMERANG would be hex "COB420023000003E9."

A private SIP Header that is inserted by the SIP Service Broker the first time that an SIP INVITE for a session is received, is propagated through the SIP Application Servers. The same private header can also be carried through any other SIP Service Brokers that are encountered between two ends of a signaling chain. A primary purpose of the header is to permit the correlation portions of the transaction that occurred between the two ends, particularly to account for services and to note billing events or marker occurrences generated by the SIP Service Broker and/or by the SIP Application Servers.

The invocation of a SIP Application Server from the SIP Service Broker proceeds according to predetermined information associated with the Service Control Group(s) to which a subscriber is provisioned. A defined Service Control Group has a list of one or more trigger events/conditions (e.g., Originating Dialed Digits Complete, Originating Called Party Busy, Originating No Answer, Originating Disconnect, Terminating Call Attempt, Terminating Called Party Busy, Terminating No Answer, Terminating Disconnect), each mapped to a SIP Application Server type.

Figure 11:
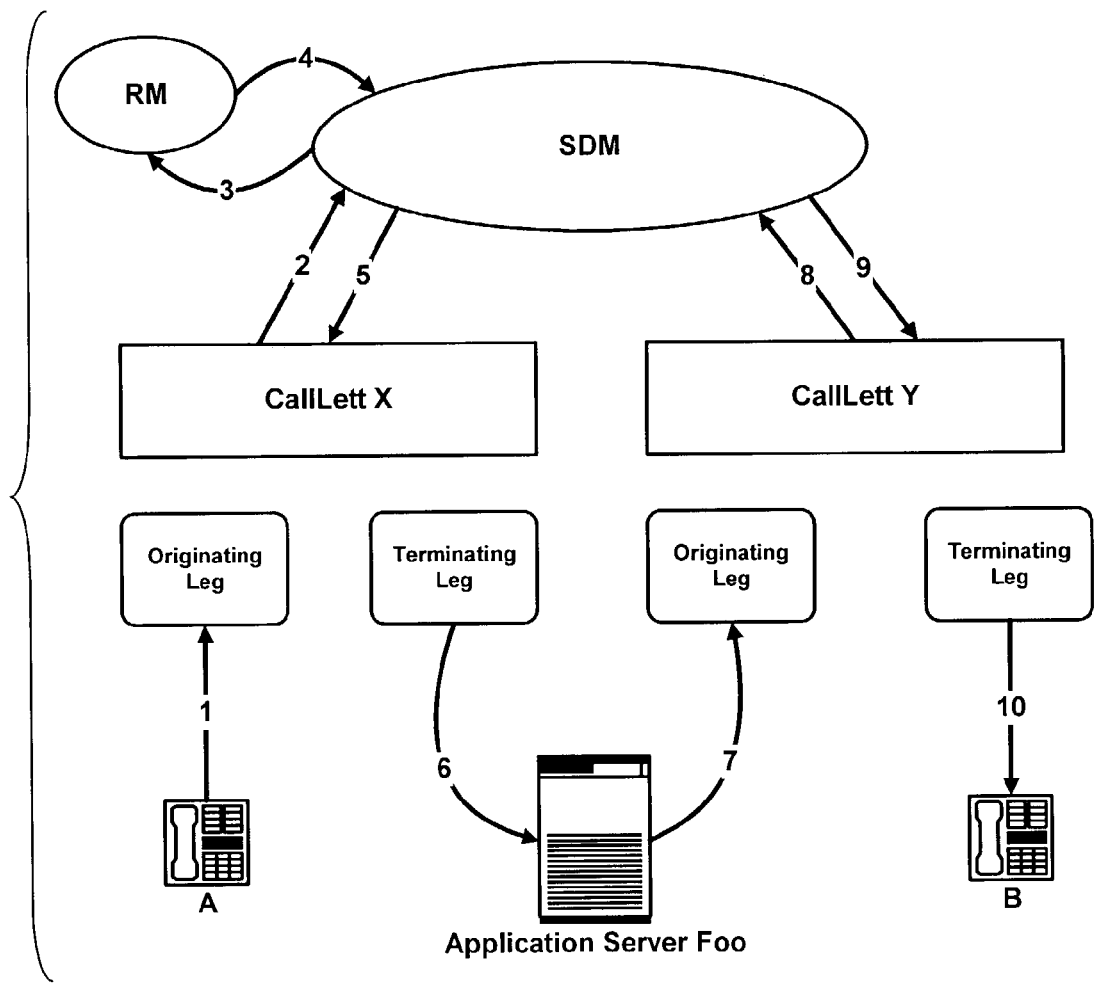
FIG. 11 is a diagram showing the invocation of a single SIP application server from the Service Controller.
Figure 12:
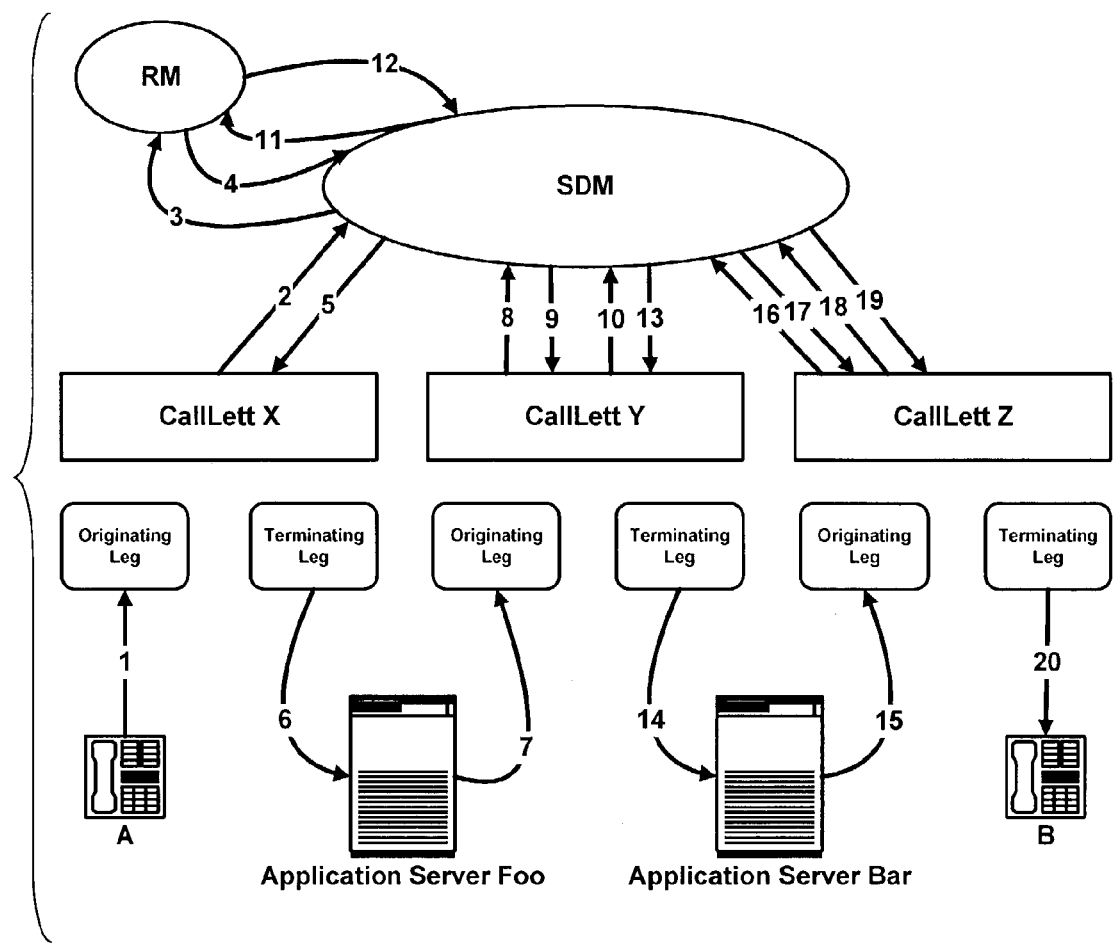
FIG. 12 is a diagram showing the chaining of two SIP application servers that share a common triggering event by the Service Controller.
Figure 13:
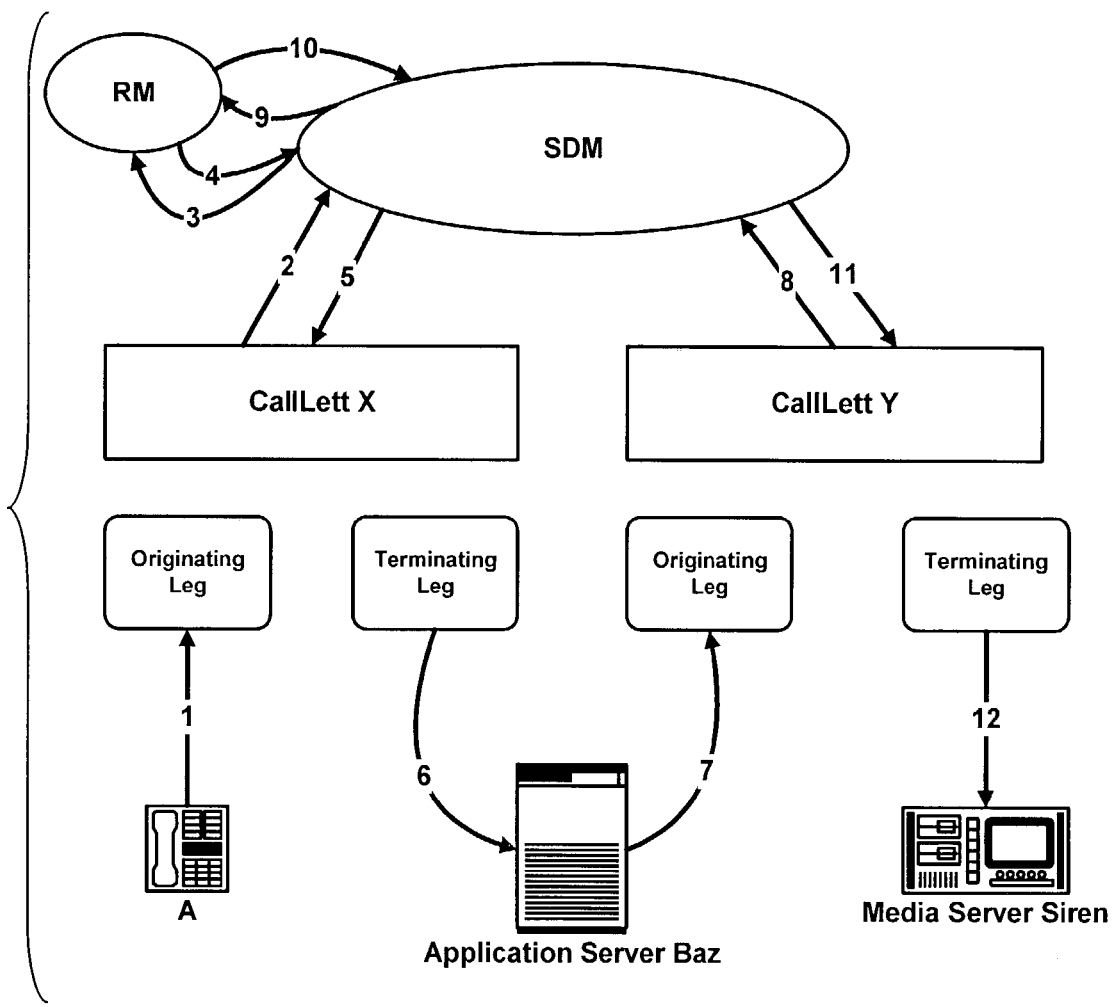
FIG. 13 is a diagram showing the invocation of a Media Server from a SIP application server using the Service Controller.

When the Call Model of the SIP Application encounters a trigger event, the call set-up process is suspended and control passes to the Service Distribution Manager (SDM). SDM responds with either a Continue response (i.e., an instruction to continue with the call set-up process) or a Connect response (an instruction to connect to an Application Server). FIGS. 11–13 and the following description illustrate exemplary steps that are undertaken by programmed operation of the respective elements.

FIG. 11 shows an example of steps that can be used during invocation of a single application server triggered for the terminating subscriber. In this example A refers to the originating party and B the terminating party. The terminating party, B, has a service Gog, provided by application server Foo.

1—Inbound call (SIP INVITE) is received by the SIP Service Controller; a new CallLett (X) is created; the trigger information from B's Service Control Groups is accessed from the in-memory data store.

2—Examination of the trigger data from B's Service Control Groups determines that B has a terminating service (Gog). SDM is invoked.

3—SDM queries Resource Manager RM to determine if B's resource policy permits access to the service Gog at this time.

4—RM returns an application server instance: Foo.

5—SDM issues a Connect to the call model for application server Foo (passing the Request-URI and an application tag to be used to correlate the call).
6—The call signaling (INVITE) is sent to the application server; and the application tag is placed in the private SIP header (LSI-BOOMERANG). The SIP Service Controller is now acting as a B2BUA between A and Foo (represented by CallLett X).
7—The application server (possibly acting as a B2BUA or a proxy) propagates the call signaling back to the SIP Service Controller, passing back the LSI-BOOMERANG header. To the SIP Service Controller this resembles a new inbound call from A to B, and it is initially handled in the same manner as step 1 above, with a new CallLett Y being created.
8—Like CallLett X, CallLett Y triggers on the same terminating service (Gog) for B and SDM is invoked; the application tag from LSI-BOOMERANG is passed.
9—SDM (from the application tag), knows that application server Foo is already active on the session so does not re-invoke it. SDM returns a plain Continue operation.
10—The call signaling (INVITE) is sent to B. The SIP Service Controller is now acting as a pair of B2BUAs, one between A and Foo (CallLett X) and another between Foo and B (CallLett Y).

FIG. 12 shows the steps for the invocation of two application servers sharing a common triggering event for a terminating subscriber. In this example, as in the previous one, A refers to the originating party and B the terminating party. The terminating party (B) this time has two services (Gog and Magog) provided by application servers (Foo and Bar) where Gog has priority over Magog and no conflicts exist.

1—Inbound call (SIP INVITE) is received by the SIP Service Controller; a new CallLett (X) is created; the trigger information from B's Service Control Groups is accessed from the in-memory data store.
2—Examination of the trigger data from B's Service Control Groups determines that B has terminating services (Gog and Magog); Gog has priority over Magog, so SDM is invoked for Gog.
3—SDM queries RM to determine if B's resource policy permits access to service Gog at this time.
4—RM returns application server instance: Foo.
5—SDM issues a Connect to the call model for application server Foo (passing the Request-URI and an application tag it will use to correlate the call).
6—The call signaling (INVITE) is sent to the application server, the application tag is placed in the private SIP header (LSI-BOOMERANG). The SIP Service Controller is now acting as a B2BUA between A and Foo (represented by CallLett X).
7—The application server (acting as a B2BUA or a proxy) propagates the call signaling back to the SIP Service Controller, passing back the LSI-BOOMERANG header. To the SIP Service Controller, this looks like a new inbound call from A to B, and is initially handled in the same manner as step 1 above, with a new CallLett Y being created.
8—Similarly to CallLett X, CallLett Y triggers on the same terminating service for B and SDM is invoked (for Gog), the application tag from LSI-BOOMERANG is passed.
9—SDM (from the application tag), determines that application server Foo is already active on the session so does not re-invoke it. SDM returns a plain Continue operation.
10—The call model for CallLett Y continues call set-up examining B's trigger data and determines that a further service (Magog) should be invoked. SDM is invoked for Magog; the application tag is passed.
11—Magog is not already active on the call and does not conflict with Gog, so SDM queries RM to get the application server instance and to check resource policies.
12—RM returns application server Bar.
13—SDM issues a Connect to the call model for application server Bar (passing the Request-URI and an application tag it will use to correlate the call).
14—The call signaling (INVITE) is sent to the application server, the application tag is placed in the private SIP header (LSI-BOOMERANG). The SIP Service Controller is now acting as two B2BUA's, one between A and Foo (represented by CallLett X) and one between Foo and Bar (represented by CallLett Y).
15—The application server (acting as a B2BUA or a proxy) propagates the call signaling back to the SIP Service Controller, passing back the LSI-BOOMERANG header. To the SIP Service Controller, this looks like a new inbound call from A to B and is initially handled in the same manner as step 1 above, with a new CallLett Y being created.
16—Similarly to CallLett X and Y, CallLett Z triggers on the same terminating service for B and SDM is invoked (for Gog), the application tag from LSI-BOOMERANG is passed.
17—SDM (from the application tag), knows that application server Foo is already active on the session so does not re-invoke it. SDM returns a plain Continue operation.
18—The call model for CallLett Z continues call set-up examining B's trigger data and determines a further service (Magog) should be invoked. SDM is invoked for Magog; the application tag is passed.
19—SDM (from the application tag), knows that application server Bar is already active on the session so does not re-invoke it. SDM returns a plain Continue operation.
20—The call signaling (INVITE) is sent to B. The SIP Service Controller is now acting as a trio of B2BUAs, one between A and Foo (CallLett X) and another between Foo and Bar (CallLett Y) and a third between Bar and B (CallLett Z).

FIG. 13 shows the steps for the invocation of a single application server which makes use of a media server. In this example A refers to the originating party and B to the terminating party (the terminating party is never connected in this example). The terminating party, B, has a service SVX, provided by application server Baz which makes use of IVR (Interactive Voice Response) capabilities of media server Siren.

1—Inbound call (SIP INVITE) is received by the SIP Service Controller; a new CallLett (X) is created; the trigger information from B's Service Control Groups is accessed from the in-memory data store.
2—Examination of the trigger data from B's Service Control Groups determines that B has a terminating service (SVX). SDM is invoked.
3—SDM queries RM to determine if B's resource policy permits access to the service SVX at this time.

4—RM returns an application server instance: Baz.

5—SDM issues a Connect to the call model for application server Baz (passing the Request-URI and an application tag it will use to correlate the call).

6—The call signaling (INVITE) is sent to the application server, the application tag is placed in the private SIP header (LSI-BOOMERANG). The SIP Service Controller is now acting as a B2BUA between A and Baz (represented by CallLett X).

7—The application server (acting as a B2BUA or a proxy) issues a request (INVITE) for a media server with IVR capabilities to the SIP Service Controller, passing back the LSI-BOOMERANG header. To the SIP Service Controller this looks like a new inbound call. CallLett Y is created to handle it.

8—The logical media resources such as IVR are registered as originating triggers. SDM is invoked to request a media server of the appropriate type.

9—SDM queries RM to get a media server instance that can provide IVR capabilities and to check resource policies.

10—RM returns media server instance: Siren.

11—SDM issues a Connect to the call model for media server Siren (passing the Request-URI and an application tag it will use to correlate the call).

12—The call signaling (INVITE) is sent to the media server; the application tag is placed in the private SIP header (LSI-BOOMERANG). The SIP Service Controller is now acting as a pair of B2BUA's, one between A and Baz (represented by CallLett X) and one between Baz and Siren (represented by CallLett Y).

From an accounting or billing perspective, the engagement (or invocation) of each Application Server in the chain can result in a separate billing record event, generated by the Service Controller. To correlate all the billing record events along the SIP 'chain' that constitutes a single end to end transaction or 'call,' a private header is added by the Service Controller the first time that an INVITE for a new 'call' is received. The private header propagates through the entire signaling chain, even one which spans multiple SIP Service Broker instances. All the events can be taken into account when summarizing the allocation and use of resources.

Consistently with this description, the Service Controller is programmed simply to check each incoming INVITE for the presence of a private header. If a private header is present, then it is propagated. Any billing information is correlated to the private header that was found. If not private header is found, then one is created, inserted and forwarded along.

A private header added by the Service Controller (FIG. 1) is LSI-TESSELATE with the contents set to the Call ID of the initial INVITE for a call received by the Service Controller. The content of the LSI-TESSELATE is forwarded, unmodified, in the INVITE message from the application server to the Service Controller. The contents of the LSI-TESSELATE header can be included in a suitable field of any billing event or billing record generated by the Application Server such that it can be correlated with the other billing records generated for the call, in the same manner as discussed.

Using a propagating private header portion to mark related signals has been proposed before, and was recently written into RFC 3455 [Private Header (P-Header) Extensions to the Session Initiation Protocol (SIP) for the 3rd-Generation Partnership Project (3GPP)] authored by M. Garcia-Martin (Ericsson), E. Henrikson (Lucent) and D. Mills (Vodafone), issued January 2003. The present application is a novel application of this signaling technique and usefully applies it on the fly allocations of resources as described.

According to a further aspect, a mechanism is provided for the SIP Application Servers to add data into billing records created by the Service Controller to account for the invocation of the SIP Application Servers. The data to be included in the billing record is transmitted by the SIP Application Server to the Service Controller in the session termination signaling. This technique provides a signaling capability on the end of a transaction or portion of a transaction, which capability is not available on the INVITE or beginning end because the transaction is then only commencing and might proceed in ways that generate different sums for accounting (for example, the duration of the service cannot be known at the outset).

According to another aspect, SIP Application Servers that are involved when a billing event occurs can pass data to be included in an accumulating billing record maintained at the Service Controller for each call. The Service Controller in that case creates a private header when first invoking an Application Server on a call. The Applications Servers report back to add to the accumulating record. This technique is relatively simple for the billing collection and mediation processes, because few network elements and few steps are employed to produce billing records. According to the invention it can be done at the conclusion of processing of a segment of the call by the respective Application Server.

The Service Controller accepts up to 64 bytes of free format data (as an ASCII MIME attachment) in the session terminating message (BYE or "200" response to the BYE) for the SIP transaction from the Service Controller to the SIP Application Server (as opposed to the SIP transaction from the SIP Application Server back to the Service Controller). Termination from the Application Server side includes BYE with attached free format billing information transmitted to the Service Controller, to which the Service Controller replies "200 OK." Termination from the Service Controller side includes BYE, to which the Application Server replies "200 OK" with attached free format billing information. Thus whether termination is signaled from one side or the other, the billing information is transmitted.

It is to be understood that the invention is not limited only to the particular constructions herein disclosed and shown in the drawings, but also encompasses modifications or equivalents within the scope of the appended claims.

What is claimed is:

1. A telecommunications system, comprising:
  a communications network having a plurality of telecommunications applications capable of communication over the network, wherein the telecommunications applications have diverse specifications with respect to at least one of input specifications, function carried out, output specifications, information for accounting purposes, subscription terms and resource utilization limitations, wherein at least two said telecommunications applications operate cooperatively at least in some situations;
  a service broker system comprising at least one programmed processor operable to allocate and selectively enable use of telecommunications applications and media servers to meet demand;
  wherein an allocation of the telecommunications applications and media servers to meet the demand is changeable by the service broker system during operation of the telecommunications system; and, wherein the specifications of said telecommunications applications and media servers are represented in at least one data store maintained by the service broker system, and further comprising a service integrator element, operable to add and to modify information in the data store, thereby defining operational structures available for the service broker to coordinate interactions with new and reconfigured said telecommunications applications and media servers.

2. The telecommunications system of claim 1, further comprising a Service Controller wherein:

the Service Controller monitors and controls network elements on behalf of the allocated resources, through at least one Network adapter;

a Call Model reflects a state of the network elements for a subscriber's session;

a Service Distribution Manager acts on the state reflected by the Call Model according to definitions of the subscribers service control groups and invokes appropriate resources;

a Resource Manager monitors at least one of access and real time usage of the resources in fulfilling a demand;

a Billing Logs Alarms and Metrics Engine (BLAME) collects Billing, Log, Alarm and Metric information from one or more of the Network adapter, Service Distribution Manager, Resource Manager and the subscriber and reports data to the Service Manager; and, further comprising a plurality of Application adapters through which the Service Controller invokes and communicates with said resources.

3. The telecommunications system of claim 2, wherein the service controller includes a service distribution manager component for distribution of events to resources through the Network adapter, wherein the service distribution manager component communicates with said resources according to a standard that is consistent for at least subsets of said resources.

4. The telecommunications system of claim 3 wherein communications with said resources comply with said standards defined by the Service Integrator during creation of respective ones of the logical services.

5. The telecommunications system of claim 2, wherein the service controller includes a service distribution manager component for marshalling instructions from said resources according to the call model, and wherein the service distribution manager applies an event queuing mechanism by which instructions from multiple concurrently operable resources are applied automatically to the call model.

6. The telecommunications system of claim 2, wherein the service controller includes a service distribution manager component for management of precedence rules for invocation of the resources, wherein the precedence rules govern an order of invocation of said resources when multiple said resources are accessible via a common initiating event or condition, and wherein the precedence are a defined aspect of one of the Service Control Groups of which the respective resource is a part.

7. The telecommunications system of claim 2, wherein the service controller includes a service distribution manager component for management of conflict rules for invocation of resources, wherein a conflict occurs when a given resource cannot be invoked if another given resource is already active, and wherein the conflict rules are a defined aspect of a respective one of the Service Control Groups.

8. The telecommunications system of claim 2, wherein the service controller acts on said resources using network level protocols that are invoked through one of the network adapters.

9. The telecommunications system claim 8, wherein the network level protocol comprises Session Initiation Protocol .

10. The telecommunications system of claim 2, wherein the service controller includes a resource manager component for real-time policing of resource policies governing access to resources by a customer having one of a proprietary, contractual and usage right to respective resources, which right is associated with one or more subscribers and/or other customers.

11. The telecommunications system of claim 10, wherein the resource policies can range from zero to a predetermined portion of resources that are one of dedicated to the customer and shared by the customer with other customers.

12. The telecommunications system of claim 10, wherein the resource policies reflect a level hierarchy of customers having distinct rights to resources under the resource policies.

13. The telecommunications system of claim 10, wherein the resource policies are assigned to the customer by the Service Manager component of the Service Broker.

14. The telecommunications system of claim 2, wherein the service controller includes a network adapter that reports events received from network elements to the call model, for changing a subscriber's connection state, and wherein such reports of the events can trigger a change in the invocation of resources by the service controller.

15. The telecommunications system of claim 2 comprising means to generate a billing record to account for at least certain of the resources invoked during a subscriber's session.

16. The telecommunications system of claim 2, wherein the billing record is determined at least party from data produced by the resource that is invoked.

17. A telecommunications system, comprising:

a communications network having a plurality of telecommunications applications capable of communication over the network, wherein the telecommunications applications have diverse specifications with respect to at least one of input specifications, function carried out, output specifications, information for accounting purposes, subscription terms and resource utilization limitations, wherein at least two said telecommunications applications operate cooperatively at least in some situations;

a service broker system comprising at least one programmed processor operable to allocate and selectively enable use of telecommunications applications and media servers to meet demand;

wherein an allocation of the telecommunications applications and media servers to meet the demand is changeable by the service broker system during operation of the telecommunications system;

wherein the specifications of said telecommunications applications and media servers are represented in at least one data store maintained by the service broker system, and wherein the service broker system comprises:

a service integrator element operable to add and to modify information in the data store for defining and publishing operational structures required for the service broker to coordinate interactions with said telecommunications applications and media servers;

a service manager element operable to add and to modify information in the data store for operations required to activate, provision, account and manage use of elements of said telecommunications network including said telecommunications applications and media servers; and, a service controller element operable to communicate and coordinate service invocation requests received via network signaling based on definitions published by the service integrator element and activated by the service manager element, to the telecommunication applications, media servers and the communications network.

18. The telecommunications system of claim 17, wherein the service integrator element comprises: an Extendable Set of Operational Fields and Messages containing at least a portion of information required by the service broker during communications with operations systems, telecommunication applications and media servers;

an Adapter Manager component containing is a tool by which users manage mapping of fields and messages to transactional terms and actions, and transports for communicating with operational systems, telecommunication applications and media servers;

a Logical Service Encapsulation Manager component operable to create and manage logical services, each containing at least one of the telecommunication applications, the logical services providing units that the service manager element and the service controller element allocate for use of the telecommunications applications and media servers;

a Service Control Group (SCG) Manager component operable to create and manage groups of said logical services and to define sets of rules governing one or more of signaling interactions, conflicts and precedence rules, for signaling messages used by the service controller element in connection with real-time service invocations;

a Version Controller tool operable to manage successive versions of messages, adapters, logical services and service control groups when new and changed versions are made available to the service manager;

a Publication Engine component operable to enable and disable versions of messages, adapters, logical services and service control groups by the service manager.

19. The telecommunications system of claim 17, wherein the service manager element comprises:

a Configuration Controller component that receives information published from the service integrator element and manages deactivation of previous versions and migration to new versions of said information published from the service integrator element;

a Deployment Manager component for managing deployment of new versions of messages, adapters, logical services and service control groups into a real time environment managed by the service controller element;

a Billing Engine component which receives billing information generated by the telecommunication applications and by the service controller element, correlates said generated billing information and reports the billing information;

a Provisioning Engine component which receives provisioning information from operational systems for providing the provisioning information, selects specific telecommunication application servers based on at least one of provisioning policies, location and ownership rules, records in the data store a copy of the provisioning information as received, and communicates this provisioning information to at least a selected one of the telecommunications application servers via a defined adapter, said adapter being associated with one of a logical service and s service control group that is invoked;

a Resource Provisioning Engine component that defines, associates and validates resource policies between groups of subscribers and actual telecommunication applications and media servers;

a Log, Alarms and Metrics Engine component operable to receive log, alarm and metric information from the service controller element, to record said log, alarm and metric information in the data store, correlate said log, alarm an metric information with a subscriber group and report to one or more operation systems;

a Security Manager component that grants, revokes and enforces access to system manager components and functions, by GUI users and operational systems;

a Data Manager component that manages the data store; an Event Scheduler component that initiates system manager component functions at one of predetermined times and predetermined intervals.

20. The telecommunications system of claim 19, wherein the service broker includes an accounting function for one of determining allocation of the telecommunications applications to the users and determining one of an associated credit and debit applicable to at least one of said users, other users and operational systems on the network.

21. The telecommunications system of claim 19, wherein at least a subset of said users are coupled to the service broker as suppliers of at least one of the telecommunications applications subject to allocation to others of the users by operation of the service broker.

22. Acommunications system, comprising:

a plurality of communications resources including telecommunications applications running on applications servers that are coupled with one another and with users over a network;

a supervisory service broker coupled with the applications servers and the users over the network;

wherein at least certain of the communications resources are shared by the users through the supervisory service broker, wherein the users are allocated usage of the communications resources by directing invitation messages to the resources through the service broker, and wherein the service broker manages allocation of said usage by integrating new resources, combining resources in defined groups, changing allocations of resources to particular users over time, and accounting for at least one of allocations of resources and usage of said resources by the users.

23. The system of claim 22, wherein usage of the resources is invoked using a messaging protocol, and further comprising a message controller associated with the service broker and the resources, wherein messages passing between the users and the resources and messages passing between two said resources, are passed through the service broker and are subjected to modifications and monitoring by the service broker for managing said allocation.

24. The system of claim 22, wherein the messaging protocol is Session Initiation Protocol (SIP).

25. The system of claim 22, wherein at least part of the resources are identified to the service broker as being associated with a proprietor that can be one of a user, a group of users and a carrier for supply of resources to users, and wherein the proprietor has a capability to provide access to such part of the resources to other users via the service broker.

26. The system of claim 25, wherein the service broker accounts for provision of access by the proprietor as a credit associated with the proprietor, and accounts for allocation of resources and usage of said resources by the proprietor as a debit.

27. A method for changeably configuring a telecommunications system having a plurality of users having requirements, and a plurality of telecommunications applications each having at least one of hardware and software for producing an output from an input, the method comprising the steps of:

providing a data store containing specifications for the telecommunications applications, the specifications enabling the telecommunications applications to be compared with one another by standardized criteria, the specifications defining characteristics needed for the input and characteristics provided by the telecommunications applications in the output;

wherein the telecommunications applications available for provisioning are provided on servers coupled to a packet data network, and wherein a supervisory service broker server controls said provisioning;

wherein the servers coupled to the packet data network communicate according to a protocol including invitation messages, and further comprising directing initiation messages from the users through the supervisory service broker for managing at least one of assignment of telecommunications applications during said provisioning and accounting for usage of the telecommunications applications;

adding telecommunications applications to the telecommunications system by specifying one of new services and new sources of known services, providing an entry in the data store for said new services and new sources, and revising the provisioning of the users based on availability of the new services and sources;

provisioning particular said users by assigning at least temporary access to selected ones of the telecommunications applications that meet the requirements of the particular users; and, reconfiguring the provisioning of said users from time to time by at least one of adding, substituting and removing access to the telecommunications applications by said particular users.

28. The method of claim 27, further comprising defining in the data store logical service groups of at least two telecommunications applications of which an output of one of the telecommunications applications is coupled to an input of another of the telecommunications applications and the provisioning includes assigning access to one of the groups.

29. The method of claim 27, wherein the standardized criteria includes pricing, and further comprising distinguishing among said telecommunications on grounds of price, and accounting at successive times for access by the particular users by at least one of bits transferred, time of access, available bandwidth and used bandwidth.

30. The method of claim 29, wherein the telecommunications applications include at least one billing function and wherein at least one of the users is a services supplier and provides telecommunications services to others by making at least a subset of the telecommunications applications available for use by customers.

31. The method of claim 30, wherein a plurality of said services suppliers provide said telecommunications services in competition with one another and said users compete for access to the telecommunications services.

32. The method of claim 27, wherein the supervisory service broker server controls changing the provisioning according to at least one of time of day and network traffic level.

33. The method of claim 27, further comprising guaranteeing to particular users access to a predetermined level of access to the telecommunications applications.

34. The method of claim 27, wherein the packet data network is an IP network and the protocol is Session Initiation Protocol.

* * * * *